United States Patent
Garber et al.

(10) Patent No.: US 7,044,373 B1
(45) Date of Patent: May 16, 2006

(54) RADIO FREQUENCY IDENTIFICATION SYSTEMS APPLICATIONS

(75) Inventors: Sharon R. Garber, Crystal, MN (US); Bernard A. Gonzalez, St. Paul, MN (US); Mitchell B. Grunes, Minneapolis, MN (US); Richard H. Jackson, Inver Grove Heights, MN (US); Gerald L. Karel, Maplewood, MN (US); John M. Kruse, Minneapolis, MN (US); Richard W. Lindahl, Oakdale, MN (US); James E. Nash, Bloomington, MN (US); Chester Piotrowski, White Bear Lake, MN (US); John D. Yorkovich, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/368,817

(22) Filed: Aug. 5, 1999

Related U.S. Application Data

(63) Continuation-in-part of application No. 09/134,688, filed on Aug. 14, 1998, now abandoned.

(51) Int. Cl.
*G06F 19/00* (2006.01)

(52) U.S. Cl. .................. 235/385; 235/375; 235/382

(58) Field of Classification Search .............. 235/385, 235/375, 462.01, 462.45, 462.46, 472.01, 235/381, 380, 383, 382, 486, 492; 340/572.3, 340/572.4, 572.6; 705/28
See application file for complete search history.

(56) References Cited

U.S. PATENT DOCUMENTS

| | | | |
|---|---|---|---|
| 3,593,291 A | 7/1971 | Carter | |
| 3,747,086 A | 7/1973 | Peterson | 340/280 |
| 3,750,167 A | 7/1973 | Gehman et al. | |
| 3,752,960 A | 8/1973 | Walton | 235/61 |
| 3,790,945 A | 2/1974 | Fearon | 340/280 |
| 3,816,708 A | 6/1974 | Walton | 235/61 |
| 4,063,229 A | 12/1977 | Welsh et al. | 340/280 |
| 4,141,078 A * | 2/1979 | Bridges et al. | 235/375 |
| 4,153,931 A | 5/1979 | Green et al. | 364/200 |
| 4,183,027 A | 1/1980 | Ehrenspeck | 343/726 |
| 4,223,830 A | 9/1980 | Walton | 235/380 |
| 4,312,003 A | 1/1982 | Robbins, Jr. | 343/788 |
| 4,319,674 A | 3/1982 | Riggs et al. | 194/4 |
| 4,407,000 A | 9/1983 | Sasaki et al. | 343/726 |
| 4,413,254 A | 11/1983 | Pinneo et al. | 340/572 |
| 4,442,507 A | 4/1984 | Roesner | 365/100 |
| 4,578,654 A | 3/1986 | Tait | 333/175 |
| 4,580,041 A | 4/1986 | Walton | 235/380 |
| 4,583,083 A | 4/1986 | Bogasky | 340/572 |

(Continued)

FOREIGN PATENT DOCUMENTS

DE 43 19 878 12/1993

(Continued)

OTHER PUBLICATIONS

John Bowers; "Road to intelligent tagging is paved with opportunities"; Automatic I.D. News; Oct. 1995; pp. 86-87.

(Continued)

*Primary Examiner*—Ahshik Kim
(74) *Attorney, Agent, or Firm*—Melissa E. Buss

(57) ABSTRACT

The invention relates to the use of RFID systems for use with items of interest having RFID tags, such as in a library. The invention has particular applicability to determining the location, order, and other information regarding such items.

16 Claims, 12 Drawing Sheets

U.S. PATENT DOCUMENTS

| | | | |
|---|---|---|---|
| 4,598,276 A | 7/1986 | Tait | 340/572 |
| 4,636,950 A | 1/1987 | Caswell et al. | 364/403 |
| 4,656,463 A | 4/1987 | Anders et al. | 340/572 |
| 4,656,592 A | 4/1987 | Spaanenburg | 364/490 |
| 4,673,932 A | 6/1987 | Ekchian et al. | 340/825 |
| 4,688,026 A | 8/1987 | Scribner et al. | 340/572 |
| 4,745,401 A | 5/1988 | Montean | 340/572 |
| 4,746,830 A | 5/1988 | Holland | 310/313 |
| 4,746,908 A | 5/1988 | Montean | 340/551 |
| 4,785,308 A | 11/1988 | Newcomb | 343/795 |
| 4,796,074 A | 1/1989 | Roesner | 357/51 |
| 4,805,232 A | 2/1989 | Ma | 455/291 |
| 4,827,395 A | 5/1989 | Anders et al. | 364/138 |
| 4,835,372 A * | 5/1989 | Gombrich et al. | 235/375 |
| 4,837,568 A | 6/1989 | Snaper | 340/825 |
| 4,850,009 A | 7/1989 | Zook et al. | 379/96 |
| 4,857,893 A | 8/1989 | Carroll | 340/572 |
| 4,862,160 A | 8/1989 | Ekchian et al. | 340/825 |
| 4,881,061 A | 11/1989 | Chambers | 340/568 |
| 4,924,210 A | 5/1990 | Matsui et al. | 340/572 |
| 4,964,053 A | 10/1990 | Humble | 364/466 |
| 4,967,185 A | 10/1990 | Montean | 340/572 |
| 5,008,661 A | 4/1991 | Raj | 340/825 |
| 5,019,815 A | 5/1991 | Lemelson et al. | 340/933 |
| 5,030,807 A | 7/1991 | Landt et al. | |
| 5,036,308 A | 7/1991 | Fockens | 340/572 |
| 5,059,951 A | 10/1991 | Kaltner | 340/572 |
| 5,063,380 A | 11/1991 | Wakura | 340/825 |
| 5,072,222 A | 12/1991 | Fockens | 342/44 |
| 5,083,112 A | 1/1992 | Piotrowski et al. | 340/572 |
| 5,095,362 A | 3/1992 | Roesner | 357/23.4 |
| 5,099,226 A | 3/1992 | Andrews | 340/572 |
| 5,099,227 A | 3/1992 | Geiszler et al. | 340/572 |
| 5,103,222 A | 4/1992 | Hogen Esch et al. | 340/825 |
| 5,119,070 A | 6/1992 | Matsumoto et al. | 340/572 |
| 5,151,684 A | 9/1992 | Johnsen | 340/572 |
| 5,153,842 A | 10/1992 | Dlugos, Sr. et al. | 364/478 |
| 5,204,526 A | 4/1993 | Yamashita et al. | 235/493 |
| 5,214,409 A | 5/1993 | Beigel | 340/572 |
| 5,214,410 A | 5/1993 | Verster | 340/572 |
| 5,218,343 A | 6/1993 | Stobbe et al. | 340/572 |
| 5,218,344 A | 6/1993 | Ricketts | 340/573 |
| 5,231,273 A | 7/1993 | Caswell et al. | |
| 5,239,167 A | 8/1993 | Kipp | |
| 5,253,162 A | 10/1993 | Hassett et al. | |
| 5,260,690 A | 11/1993 | Mann et al. | 340/572 |
| 5,280,159 A | 1/1994 | Schultz et al. | 231/382 |
| 5,288,980 A | 2/1994 | Patel et al. | 235/381 |
| 5,290,066 A * | 3/1994 | Mody | 281/15.1 |
| 5,296,722 A | 3/1994 | Potash et al. | 257/50 |
| 5,317,309 A | 5/1994 | Vercellotti et al. | 340/825 |
| 5,331,313 A | 7/1994 | Koning | 340/551 |
| 5,334,822 A | 8/1994 | Sanford | 235/385 |
| 5,339,074 A | 8/1994 | Shindley et al. | 340/825 |
| 5,347,263 A | 9/1994 | Carroll et al. | 340/572 |
| 5,347,280 A | 9/1994 | Schuermann | 342/42 |
| 5,353,011 A | 10/1994 | Wheeler et al. | 340/572 |
| 5,360,967 A | 11/1994 | Perkin et al. | 235/375 |
| 5,378,880 A | 1/1995 | Eberhardt | 235/439 |
| 5,392,028 A | 2/1995 | Pichl | 340/572 |
| 5,401,584 A | 3/1995 | Minasy et al. | 428/611 |
| 5,406,263 A | 4/1995 | Tuttle | 340/572 |
| 5,407,851 A | 4/1995 | Roesner | 437/47 |
| 5,420,757 A | 5/1995 | Eberhardt et al. | 361/813 |
| 5,427,640 A * | 6/1995 | Daniels | 156/248 |
| 5,430,441 A | 7/1995 | Bickley et al. | 340/825 |
| 5,432,864 A | 7/1995 | Lu et al. | 382/118 |
| 5,444,223 A | 8/1995 | Blama | 235/435 |
| 5,446,447 A | 8/1995 | Carney et al. | 340/572 |
| 5,448,110 A | 9/1995 | Tuttle et al. | 257/723 |
| 5,448,220 A | 9/1995 | Levy | 340/539 |
| 5,450,070 A | 9/1995 | Massar et al. | 340/825 |
| 5,450,492 A | 9/1995 | Hook et al. | 380/28 |
| 5,469,363 A | 11/1995 | Saliga | 364/478 |
| 5,471,203 A | 11/1995 | Sasaki et al. | 340/825 |
| 5,489,908 A | 2/1996 | Orthmann et al. | |
| 5,490,079 A | 2/1996 | Sharpe et al. | 364/467 |
| 5,497,140 A | 3/1996 | Tuttle | 342/51 |
| 5,499,017 A | 3/1996 | Beigel | 340/572 |
| 5,517,195 A | 5/1996 | Narlow et al. | 342/51 |
| 5,519,381 A | 5/1996 | Marsh et al. | 340/572 |
| 5,521,601 A | 5/1996 | Kandlur et al. | 342/44 |
| 5,528,222 A | 6/1996 | Moskowitz et al. | 340/572 |
| 5,528,251 A | 6/1996 | Frein | 343/749 |
| 5,537,105 A | 7/1996 | Marsh et al. | 340/825 |
| 5,539,394 A | 7/1996 | Cato et al. | 340/825 |
| 5,539,775 A | 7/1996 | Tuttle et al. | 375/200 |
| 5,541,585 A | 7/1996 | Duhame et al. | 340/825 |
| 5,541,604 A | 7/1996 | Meier | 342/42 |
| 5,550,547 A | 8/1996 | Chan et al. | 342/42 |
| 5,554,974 A | 9/1996 | Brady et al. | 340/572 |
| 5,565,846 A | 10/1996 | Geiszler et al. | 340/572 |
| 5,565,858 A | 10/1996 | Guthrie | 340/825 |
| 5,573,611 A | 11/1996 | Koch et al. | |
| 5,574,372 A | 11/1996 | Moritz et al. | 324/318 |
| 5,589,820 A | 12/1996 | Robinson et al. | 340/572 |
| 5,602,527 A | 2/1997 | Suenaga | 340/551 |
| 5,602,538 A | 2/1997 | Orthmann et al. | 340/825 |
| 5,604,486 A | 2/1997 | Lauro et al. | 340/572 |
| 5,610,596 A | 3/1997 | Petitclerc | 340/825 |
| 5,625,341 A | 4/1997 | Giles et al. | 340/572 |
| 5,629,981 A | 5/1997 | Nerlikar | 380/25 |
| 5,633,678 A | 5/1997 | Parulski et al. | |
| 5,635,693 A | 6/1997 | Benson et al. | 235/384 |
| 5,640,002 A | 6/1997 | Ruppert et al. | 235/472 |
| 5,646,592 A | 7/1997 | Tuttle | 340/572 |
| 5,648,765 A | 7/1997 | Cresap et al. | |
| 5,661,473 A | 8/1997 | Paschal | |
| 5,668,803 A | 9/1997 | Tymes et al. | 370/312 |
| 5,673,037 A | 9/1997 | Cesar et al. | |
| 5,682,142 A | 10/1997 | Loosmore et al. | 340/572 |
| 5,682,143 A | 10/1997 | Brady et al. | 340/572 |
| 5,689,238 A | 11/1997 | Cannon, Jr. et al. | 340/568 |
| 5,694,139 A | 12/1997 | Saito et al. | 343/866 |
| 5,705,818 A | 1/1998 | Kelbel et al. | 250/361 |
| 5,708,423 A | 1/1998 | Ghaffari et al. | 340/825 |
| 5,729,697 A | 3/1998 | Schkolnick et al. | |
| 5,739,765 A | 4/1998 | Stanfield et al. | 340/825 |
| 5,745,036 A | 4/1998 | Clare | 340/572 |
| 5,751,221 A | 5/1998 | Stanfield et al. | 340/825 |
| 5,751,257 A | 5/1998 | Sutherland | 345/2 |
| 5,768,140 A | 6/1998 | Swartz et al. | |
| 5,769,051 A | 6/1998 | Bayron et al. | |
| 5,777,884 A | 7/1998 | Belka et al. | |
| 5,785,181 A | 7/1998 | Quartararo, Jr. | 209/3.3 |
| 5,786,764 A | 7/1998 | Engellenner | 340/572 |
| 5,794,213 A | 8/1998 | Markman | |
| 5,799,302 A | 8/1998 | Johnson et al. | |
| 5,804,810 A | 9/1998 | Woolley et al. | 235/492 |
| 5,808,558 A | 9/1998 | Meek et al. | 340/870 |
| 5,822,714 A | 10/1998 | Cato | 702/108 |
| 5,842,118 A | 11/1998 | Wood, Jr. | 455/101 |
| 5,850,187 A | 12/1998 | Carrender et al. | 340/825 |
| 5,859,587 A | 1/1999 | Alicot et al. | 340/572 |
| 5,886,634 A | 3/1999 | Muhme | |
| 5,887,176 A | 3/1999 | Griffith et al. | |
| 5,920,053 A | 7/1999 | DeBrouse | |
| 5,920,261 A | 7/1999 | Hughes et al. | 340/572 |
| 5,929,801 A | 7/1999 | Aslanidis et al. | 342/44 |
| 5,936,527 A | 8/1999 | Isaacman et al. | 350/572.1 |
| 5,939,984 A | 8/1999 | Brady et al. | 340/572 |
| 5,963,134 A | 10/1999 | Bowers et al. | 340/572 |
| 5,995,017 A | 11/1999 | Marsh et al. | 340/825 |
| 6,037,879 A | 3/2000 | Tuttle | 340/825 |

| | | | | |
|---|---|---|---|---|
| 6,056,199 A * | 5/2000 | Wiklof et al. ......... 235/462.45 |
| 6,057,756 A | 5/2000 | Engellenner ................ 340/505 |
| 6,074,156 A * | 6/2000 | Frich .................... 414/331.01 |
| 6,078,251 A | 6/2000 | Landt et al. ............. 340/10.41 |
| 6,084,528 A | 7/2000 | Beach et al. ................ 340/825 |
| 6,127,928 A | 10/2000 | Issacman et al. ........ 340/572.1 |
| 6,150,921 A | 11/2000 | Werb et al. .................... 340/10 |
| 6,154,137 A | 11/2000 | Goff et al. ............... 340/572.4 |
| 6,182,053 B1 | 1/2001 | Rauber et al. ................ 705/28 |
| 6,185,165 B1 * | 2/2001 | Jesionowski et al. .... 369/30.34 |
| 6,201,474 B1 * | 3/2001 | Brady et al. ................ 235/381 |
| 6,203,262 B1 * | 3/2001 | Frich et al. ........... 414/331.01 |
| 6,218,942 B1 | 4/2001 | Vega et al. ................. 340/572 |
| 6,232,870 B1 | 5/2001 | Garber et al. ................. 340/10 |
| 6,244,512 B1 | 6/2001 | Koenck et al. ............. 235/472 |
| 6,269,572 B1 * | 8/2001 | Forsythe et al. .............. 40/657 |
| 6,317,028 B1 | 11/2001 | Valiulis |
| 6,318,636 B1 | 11/2001 | Reynolds et al. |
| 6,335,686 B1 | 1/2002 | Goff et al. |
| 6,570,492 B1 * | 5/2003 | Peratoner ............... 340/310.01 |
| 6,749,116 B1 * | 6/2004 | Massaro ..................... 235/383 |
| 6,753,830 B1 * | 6/2004 | Gelbman ..................... 345/55 |
| 6,819,222 B1 | 11/2004 | Lin et al. |
| 2002/0008621 A1 | 1/2002 | Barritz et al. |
| 2002/0188702 A1 | 12/2002 | Short, III. et al. |

FOREIGN PATENT DOCUMENTS

| | | |
|---|---|---|
| DE | 44 15 801 | 9/1994 |
| DE | 43 41 880 A1 | 6/1995 |
| EP | 0 494 114 | 7/1992 |
| EP | 0 526 038 | 2/1993 |
| EP | 0 585 132 | 3/1994 |
| EP | 0 598 624 | 5/1994 |
| EP | 0 615 285 | 9/1994 |
| EP | 0 637 093 | 2/1995 |
| EP | 0 689 151 | 12/1995 |
| EP | 0 702 323 A2 | 3/1996 |
| EP | 0 710 853 | 5/1996 |
| EP | 0 740 262 | 10/1996 |
| EP | 0 747 990 | 12/1996 |
| EP | 0 762 535 | 3/1997 |
| EP | 0 794 507 A2 | 9/1997 |
| EP | 0 805 507 | 11/1997 |
| EP | 0 810 567 | 12/1997 |
| EP | 0 825 672 | 2/1998 |
| FR | 2 555 339 | 5/1985 |
| FR | 2 701 146 | 8/1994 |
| GB | 2 098 768 | 11/1982 |
| GB | 2 186 467 | 8/1987 |
| GB | 2 204 162 | 11/1988 |
| GB | 2 306 726 A | 5/1997 |
| GB | 2 308 947 | 7/1997 |
| JP | 04047995 | 2/1992 |
| JP | 07254092 | 10/1995 |
| JP | 8-108911 | 4/1996 |
| JP | 2001229263 A * | 8/2001 |
| NL | 9400091 | 9/1995 |
| WO | WO 90/05968 | 5/1990 |
| WO | WO 95/12870 | 5/1995 |
| WO | WO 96/41296 | 12/1996 |
| WO | WO 97/15031 | 4/1997 |
| WO | WO 97/29464 | 8/1997 |
| WO | WO 97/36270 | 10/1997 |
| WO | WO 97/50057 | 12/1997 |
| WO | WO 98/13800 | 4/1998 |
| WO | WO 98/13804 | 4/1998 |
| WO | WO 98/13805 | 4/1998 |
| WO | WO 98/16070 | 4/1998 |
| WO | WO 98/16849 | 4/1998 |
| WO | WO 98/27670 | 6/1998 |
| WO | WO 98/59258 | 12/1998 |
| WO | WO 99/05659 | 2/1999 |
| WO | WO 99/05660 | 2/1999 |
| WO | WO 99/10839 | 3/1999 |
| WO | WO 99/64974 | 12/1999 |
| WO | WO 99/65006 | 12/1999 |
| WO | WO 00/16280 | 3/2000 |

OTHER PUBLICATIONS

Finkenzeller; "RFID Handbook—Radio-Frequency Identification Fundamentals and Applications"; 1999; pp. 227-273.

Flyer entitled "Combined Anti-Theft and RF Programmable Tag" from ISD (RF/ID) Ltd.

"VTLS RFID Solution" from VTLS Inc. Web site (2 pgs.) dated Sep. 13, 2001.

Jeff Hedlund et al.; "SmartBookcase" (2 pgs.) dated Sep. 13, 2001.

"Automated Library Management System"; IBM Technical Disclosure Bulletin, Mar. 1992; (2 pgs.).

Herdeen, Frederick et al.; "Get a lock on inventory"; Security Management; Arlington; Oct. 1996 (6 pgs.).

Hornak, J.P.; "Auto ID . . . putting the control in inventory control"; Industrial Engineering; Norcrosss; Aug. 1994 (2 pgs.).

Abstract of article entitled "TI: The role and function of the shelflist in an automated library environment"; 1996 (1 pg.).

* cited by examiner

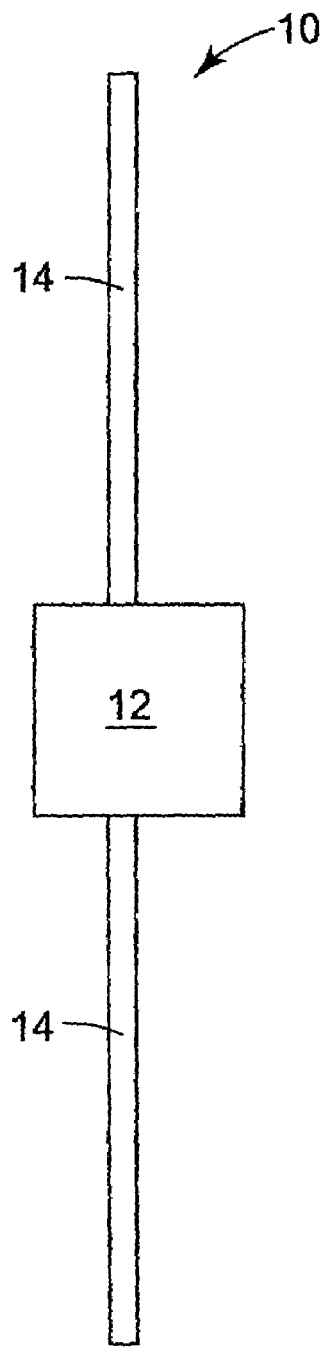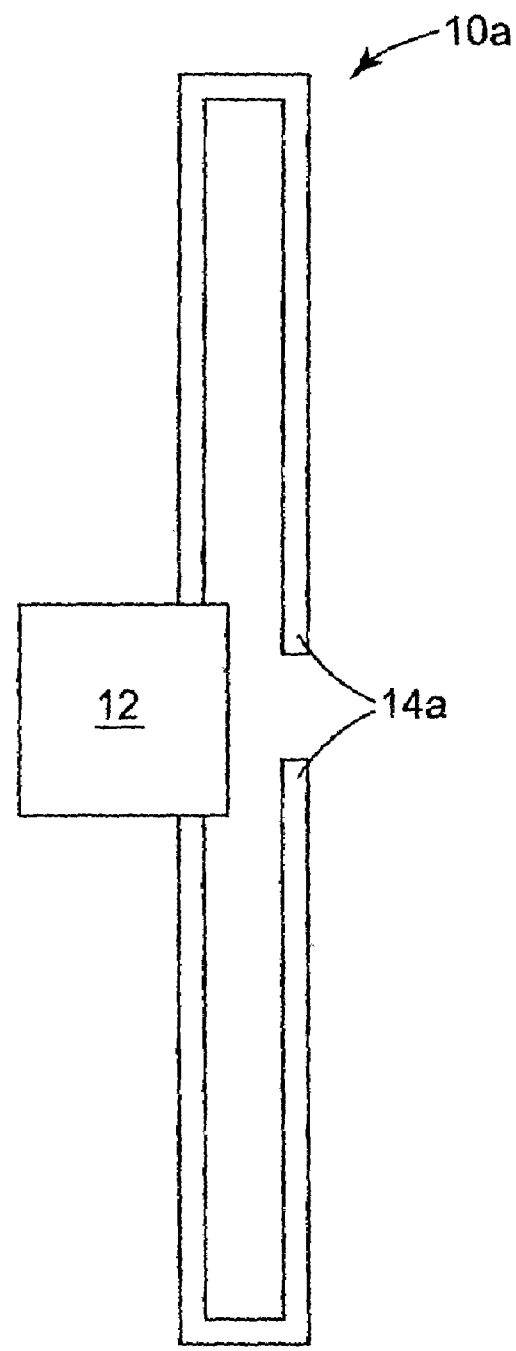
*Fig. 1A*  *Fig. 1B*

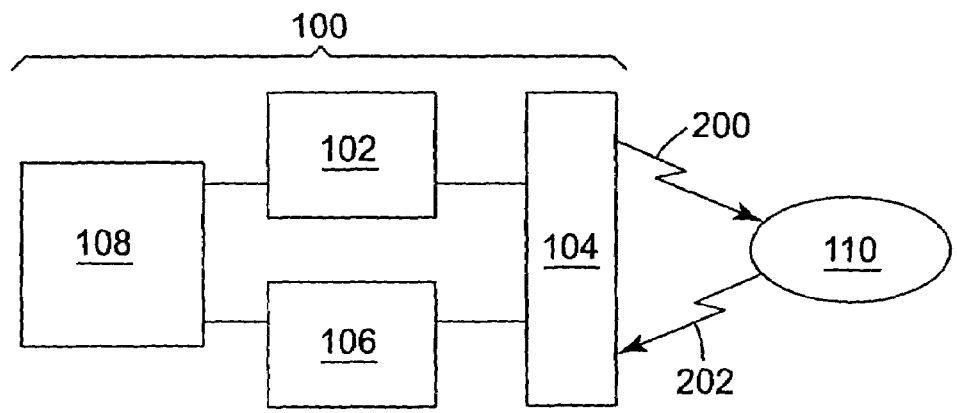
*Fig. 4*
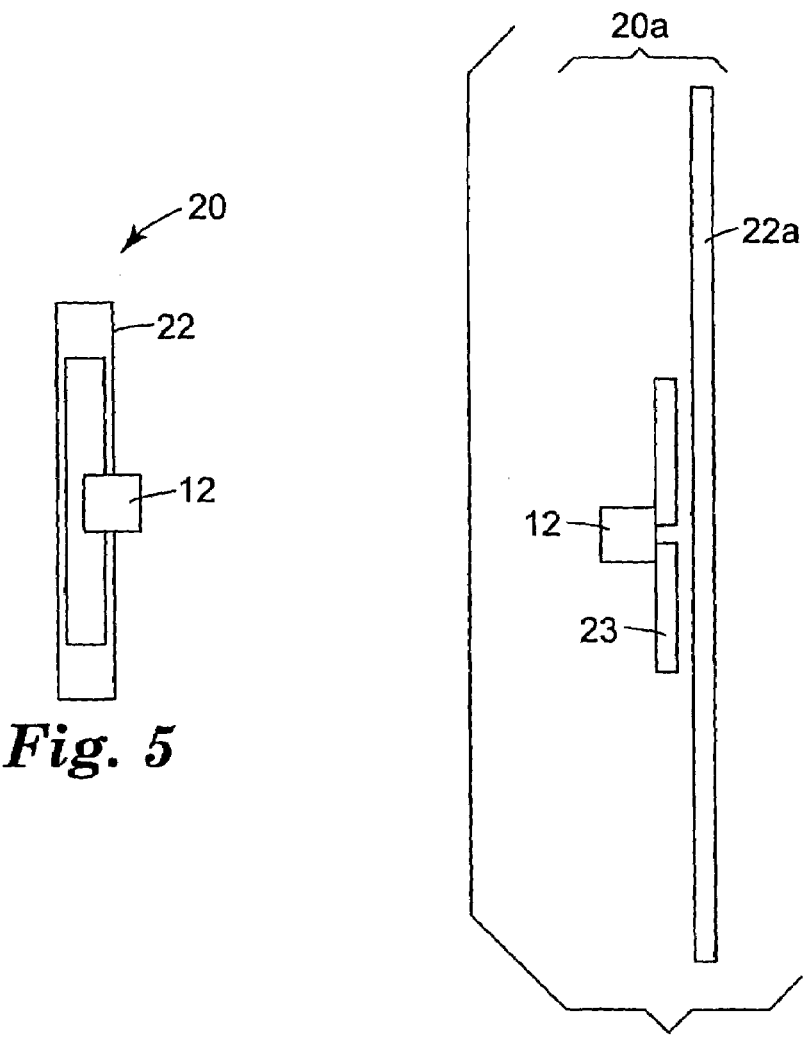
*Fig. 5*
*Fig. 6*

RADIO FREQUENCY IDENTIFICATION SYSTEMS APPLICATIONS

RELATED APPLICATION AND INCORPORATION BY REFERENCE

This patent application is a continuation-in-part of and claims priority from U.S. application Ser. No. 09/134,688, filed Aug. 14, 1998 now abandoned with the same title, which was assigned to the assignee of the present invention, and the contents of which is incorporated by reference herein.

TECHNICAL FIELD

The invention relates to applications for radio frequency identification (RFID) systems, and particularly to the use of such systems in libraries.

BACKGROUND OF THE INVENTION

Electronic article surveillance ("EAS") systems detect the presence of small electronic devices placed on or in an article or carried by a person of interest, and are often used in retail or library environments to deter theft or other unauthorized removal of articles. These devices, which are commonly known as tags or markers, have in the past contained only information regarding the presence of an item. This information could be obtained by electronically interrogating the tag, either intermittently or continuously. At least four distinct types of EAS systems have evolved over the years, based on how this interrogation was carried out: magnetic, magnetomechanical, radio frequency (RF), and microwave. Of these four, magnetic systems have provided the highest level of security in most applications. Magnetic tags are easily hidden in or on an object, difficult to detect (because they are less susceptible to shielding, bending, and pressure), and easy to deactivate and reactivate, thereby providing a high degree of security and some information regarding the status of the tagged article.

Many users of EAS systems desire to know more than just whether a tagged object is present. They also want to know which tagged object is present, for example. Detailed information regarding the characteristics of objects, such as their date of manufacture, inventory status, and owner have generally been communicated to automated handling and control systems through an optical bar code. While inexpensive and effective, the optical bar code system has certain limitations. Bar codes must be visible, which limits the locations in which they may be placed, and bar codes can easily be obscured, either accidentally or intentionally. The range at which a detector can sense the bar code is also comparatively small. The bar code may also have to be appropriately positioned for detection. Also, because bar codes are often exposed to permit detection, the barcode is susceptible to damage that can result in detection failures. Lastly, multiple items must be processed one at a time. These constraints of bar code systems make them undesirable or inefficient for some applications, such as marking library media.

More recently, electronic identification (also known as radio frequency identification or RFID) techniques have been developed to address the limitations of optical barcodes. RFID systems have succeeded in providing object identification and tracking, but are deficient in providing object security because most RFID systems operate in frequency ranges (~1 MHz and above) in which the tag is easily defeated. The security deficiency associated with radio frequency tags arises because they can be "shielded" by, for example, covering the tag with a hand or aluminum foil, or even placing the tag in a book. Even battery-powered radio frequency tags may be blocked, although their range is superior and blocking would be more difficult. Thus, objects tagged with an RFID tag may escape detection, either inadvertently or intentionally. This greatly reduces their effectiveness as security devices. RFID markers are also related to "smart cards." Both contact and contactless smart cards have appeared in commercial applications. Smart cards tend to be associated with a specific person rather than with a tagged object. Issues related to the security and tracking of the smart card (or of the person carrying it) are similar to those discussed above for RFID markers.

The security issues associated with RFID markers are similar to those familiar to anyone skilled in the art of radio frequency- and microwave-based EAS tags. Substantial effort has been expended in attempts to remedy the deficiencies of radio frequency- and microwave-based EAS tags. However, none has substantially improved their performance as security tags. U.S. Pat. No. 5,517,195 (Narlow et al.), entitled "Dual Frequency EAS Tag with Deactivation Coil," describes a dual frequency microwave EAS tag that includes an antenna circuit having a diode, and a deactivation circuit. The deactivation circuit responds to a low energy alternating magnetic field by inducing a voltage in the diode of the antenna circuit so as to disable the diode and the antenna, thereby deactivating the tag. Although useful for some applications, the capacitor-based tag disclosed in Narlow et al. may leak electrical charge over time, which could cause the tag to become activated unintentionally.

Radio frequency EAS tags of the type disclosed in U.S. Pat. No. 4,745,401 (Montean et al.) include a magnetic element. The magnetic element alters the tuning of the tag when it has been suitably magnetized by an accessory device, and thereby blocks the radio frequency response of the tag. Although these tags have a certain utility, they still do not address the issues of enhanced security and identification.

Radio frequency identification technology has been developed by a number of companies, including Motorola/Indala (see U.S. Pat. Nos. 5,378,880 and 5,565,846), Texas Instruments (see U.S. Pat. Nos. 5,347,280 and 5,541,604), Mikron/Philips Semiconductors, Single Chip Systems (see U.S. Pat. Nos. 4,442,507; 4,796,074; 5,095,362; 5,296,722; and 5,407,851), CSIR (see European document numbers 0 494 114 A2; 0 585 132 A1; 0 598 624 A1; and 0 615 285 A2), IBM (see U.S. Pat. Nos. 5,528,222; 5,550,547; 5,521,601; and 5,682,143), and Sensormatic Electronics (see U.S. Pat. No. 5,625,341). These tags all attempt to provide remote identification without the need for a battery. They operate at frequencies ranging from 125 KHz to 2.45 GHz. The lower frequency tags (~125 KHz) are moderately resistant to shielding, but have only limited radio frequency functionality due to bandwidth constraints. In particular, systems based on these markers generally operate reliably only when a single tag is in the interrogation zone at a time. They also tend to be relatively bulky and expensive to manufacture. At higher frequencies, (typically 13.56 MHz, 915 MHz, and 2.45 GHz), the added bandwidth available has permitted the development of systems which can reliably process multiple tags in the interrogation zone in a short period of time. This is highly desirable for many product applications. In addition, some of the tag designs hold the promise of being relatively inexpensive to manufacture and therefore more attractive to a customer. However, these higher frequency devices share to varying degrees the susceptibility to shielding discussed earlier. Thus, they cannot provide the high level of security demanded in certain applications, such as a library.

From the foregoing discussion, it should be clear that there are a number of applications for RFID tags in various environments in which the identity of the tagged item is important. For example, PCT Publication WO 99/05660, published Feb. 4, 1999 and assigned to Checkpoint Systems, Inc., describes an inventory system using articles with RFID tags. The preferred embodiment described therein contemplates the use of RFID tags in library materials, which may then be checked nut automatically by interrogating the RFID tag to determine the identity of the material. However, a number of important or desirable library or other inventory functions remain that are not described or suggested in the '660 publication.

SUMMARY OF THE INVENTION

The present invention relates to RFID devices, including handheld RFID devices, and applications for such devices. The devices and applications may be used in connection with items that are associated with an RFID tag, and optionally a magnetic security element. The devices and applications are described with particular reference to library materials such as books, periodicals, and magnetic and optical media. Other applications for the present invention are also envisioned.

BRIEF DESCRIPTION OF THE DRAWINGS

The present invention is described in greater detail with reference to the attached Figures, in which like numbers represent like structure throughout the several views, and in which FIGS. 1A and 1B are schematic illustrations of radio frequency identification tags;

FIG. 4 is a block diagram of an RFID interrogation system interacting with an RFID tag;

FIGS. 5, 6, 7, and 8 are illustrations of combination tags according to the present invention.

DETAILED DESCRIPTION OF THE INVENTION

Figure 2:
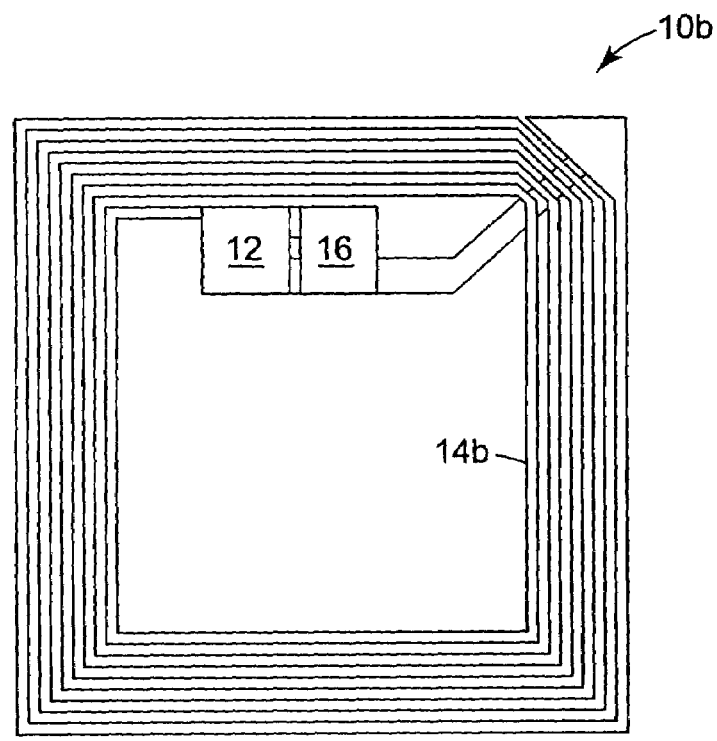
FIG. 2 is a schematic of a second embodiment of a radio frequency identification tag.

The embodiments of the present invention described herein make use of RFID tags, and preferably of combination RFID/magnetic security tags. Tags of this type were disclosed in U.S. application Ser. No. 09/093,120, filed Jun. 8, 1998 and entitled "Identification Tag With Enhanced Security," which was assigned to the assignee of the present invention and was incorporated by reference into the U.S. application from which the present application claims priority. A detailed description of the magnetic, RFID, and combination tags used in conjunction with the embodiments of the present invention is described in Section I, below, and the embodiments of the present invention are then set forth in detail in Section II, below.

I. Tags and Elements For Use With Embodiments of the Present Invention

A tag used with the embodiments of the invention described in Section II, below, may incorporate both object identification and effective security in a single device. They preferably include an element that is responsive to a magnetic interrogation signal, and an element that is responsive to a radio frequency interrogation signal. In one embodiment, the magnetically-responsive element also provides the antenna for the radio frequency-responsive element. The term "responsive" means, in the context of the present invention, that the element provides intelligible information when subjected to an appropriate interrogation field. The individual elements are described first below, followed by a description of a combination tag. As will become apparent, the embodiments of the present invention described in Section II, below, may include either an RFID element alone, or a combination of an RFID element and a magnetic security element.

A. The Magnetically-Responsive Element

The magnetically-responsive element is preferably made of a low coercive force, high permeability ferromagnetic material, such as the material used in the strips sold by the Minnesota Mining and Manufacturing Company of St. Paul, Minn. (3M) under the designation "TATTLE-TAPE™" brand strips. These strips, or marker assemblies, are described in several patents assigned to 3M, including U.S. Pat. No. 5,331,313 (Koning) and U.S. Pat. No. 3,747,086 (Peterson), the contents of which are incorporated by reference herein. Exemplary low coercive force, high permeability ferromagnetic materials include permalloy (a nickel/iron alloy), and high performance amorphous metals such as those available from the AlliedSignal Company of Morristown, N.Y. under the designations Metglas 2705M and Metglas 2714A.

The magnetically-responsive element may be either single status or dual status, depending on the nature of the article with which the element is associated. For example, certain reference books in libraries are not to be removed from the library, and thus a single-status (non-deactivatable) marker would always indicate whether such a book passed within an interrogation zone. Other articles, such as common library materials or commercial goods, may require a dual-status marker assembly, so that when the article has been properly processed the marker may be appropriately deactivated to prevent detection by the interrogation source. Dual status functionality is generally provided through the addition of sections of higher coercivity magnetic material in proximity to the low coercivity magnetic material, as described below and in the Peterson patent incorporated by reference above.

Certain magnetically-responsive elements have the ability to switch magnetic orientation rapidly when passed through a low frequency alternating magnetic field (50 Hz to 100 KHz, for example), and to produce a predetermined characteristic response that may be detected by the receiving coils of a detector. The switching function of the marker assembly is controlled by the magnetization state of the high coercive force elements, or "keeper elements." When these keeper elements are magnetized, the ability of the marker to magnetically switch back and forth within the alternating magnetic field of the interrogation zone is altered, and the marker typically is not detected. When the keeper elements are demagnetized, the marker can again perform the switching function, enabling the interrogation source to detect the presence of the marker. The keeper elements may be provided in different ways, as is known in the art.

The marker assembly may also include adhesive on one or both sides thereof, to enable the marker to be bonded to a book or other article. The adhesive layer(s) may be covered by a removable liner, to prevent adhesion of the marker to an unintended surface prior to application to the intended surface. These and other features of the marker assembly are described in the U.S. Pat. No. 3,790,945 (Fearon), U.S. Pat. No. 5,083,112 (Piotrowski), and U.S. Pat. No. 5,331,313 (Koning), all incorporated by reference above.

Because low frequency magnetic elements of this type are difficult to shield from detection, they may be effectively used on a wide variety of items when security is important. In addition, they may be deactivated and reactivated more conveniently, completely, and repeatedly than markers employing other EAS technologies, making them more suitable for use in certain applications (such as libraries) where this characteristic is highly desirable.

B. The Radio Frequency-Responsive Element

RFID tags can be either active or passive. An active tag incorporates an additional energy source, such as a battery, into the tag construction. This energy source permits active RFID tags to create and transmit strong response signals even in regions where the interrogating radio frequency field is weak, and thus an active RFID tag can be detected at greater range. However, the relatively short lifetime of the battery limits the useful life of the tag. In addition, the battery adds to the size and cost of the tag. A passive tag derives the energy needed to power the tag from the interrogating radio frequency field, and uses that energy to transmit response codes by modulating the impedance the antenna presents to the interrogating field, thereby modulating the signal reflected back to the reader antenna. Thus, their range is more limited. Because passive tags are preferred for many applications, the remainder of the discussion will be confined to this class of tag. Those skilled in the art, however, will recognize that these two types of tags share many features and that both can be used with this invention.

As shown in FIG. 1, a passive radio frequency-responsive element 10 typically includes two components: an integrated circuit 12 and an antenna 14. The integrated circuit provides the primary identification function. It includes software and circuitry to permanently store the tag identification and other desirable information, interpret and process commands received from the interrogation hardware, respond to requests for information by the interrogator, and assist the hardware in resolving conflicts resulting from multiple tags responding to interrogation simultaneously. Optionally, the integrated circuit may provide for updating the information stored in its memory (read/write) as opposed to just reading the information out (read only). Integrated circuits suitable for use in RFID markers include those available from Texas Instruments (in their TIRIS or Tag-it line of products), Philips (in their I-Code, Mifare and Hitag line of products), Motorola/Indala, and Single Chip Systems, among others.

The antenna geometry and properties depend on the desired operating frequency of the RFID portion of the tag. For example, 2.45 GHz (or similar) RFID tags would typically include a dipole antenna, such as the linear dipole antennas 4a shown in FIG. 1A, or the folded dipole antennas 14a shown attached to the radio frequency responsive element 10a in FIG. 1B. A 13.56 MHz (or similar) RFID tag would use a spiral or coil antenna 14b, as shown attached to the radio frequency responsive element 10b in FIG. 2. In either ease, the antenna 14 intercepts the radio frequency energy radiated by an interrogation source. This signal energy carries both power and commands to the tag. The antenna enables the RF-responsive element to absorb energy sufficient to power the IC chip and thereby provide the response to be detected. Thus, the characteristics of the antenna must be matched to the system in which it is incorporated. In the case of tags operating in the high MHz to GHz range, the most important characteristic is the antenna length. Typically, the effective length of a dipole antenna is selected so that it is close to a half wavelength or multiple half wavelength of the interrogation signal. In the case of tags operating in the low to mid MHz region (13.56 MHz, for example) where a half wavelength antenna is impractical due to size limitations, the important characteristics are antenna inductance and the number of turns on the antenna coil. For both antenna types, good electrical conductivity is required. Typically, metals such as copper or aluminum would be used, but other conductors, including magnetic metals such as permalloy, are also acceptable and are, in fact, preferred for purposes of this invention. It is also important that the input impedance of the selected IC chip match the impedance of the antenna for maximum energy transfer. Additional information about antennas is known to those of ordinary skill in the art from, for example, reference texts such as J. D. Kraus, Antennas (2d ed. 1988, McGraw-Hill, Inc., New York).

A capacitor 16 is often included to increase the performance of the marker, as shown in FIG. 2. The capacitor 16, when present, tunes the operating frequency of the tag to a particular value. This is desirable for obtaining maximum operating range and insuring compliance with regulatory requirements. The capacitor may either be a discrete component, or integrated into the antenna as described below. In some tag designs, particularly tags designed to operate at very high frequencies, such as 2.45 GHz, a tuning capacitor is not required. The capacitor is selected so that, when coupled to the inductance provided by the antenna, the resonant frequency of the composite structure, given by:

$$f_r = \left(\frac{1}{2\pi}\right)\sqrt{\frac{1}{LC}}$$

where
C=capacitance (in Farads)
L=inductance (in Henries)

closely matches the desired operating frequency of the RFID system. The capacitor may also be a distributed capacitor as described in U.S. Pat. No. 4,598,276 (Tait et al.) and U.S. Pat. No. 4,578,654 (Tait et al.), which are assigned to 3M. Distributed capacitance is desirable to reduce tag size, particularly thickness, and to minimize manual assembly.

In operation, as shown in FIG. 4, the radio frequency-responsive tag 110 is interrogated by an EAS security system 100, which is typically located near the point at which the tags are to be monitored. An interrogation zone may be established by placing spaced detection panels across the exits from the room in which the tagged articles are located, near a conveyor carrying items to be monitored, or the like. Hand held detection devices may also be used. An interrogation source 102 (typically including a drive oscillator and an amplifier) is coupled to an antenna 104 (sometimes described as a field coil) for transmitting an alternating radio frequency field, or interrogation signal, in the interrogation zone. The system 100 also includes an antenna for receiving a signal (shown as antenna 104, and sometimes described as a receiving coil) and detector 106 for processing signals produced by tags in the interrogation zone.

The interrogation source 102 transmits an interrogation signal 200, which may be selected within certain known frequency bands that are preferred because they do not interfere with other applications, and because they comply with applicable government regulations. When the radio frequency-responsive element receives an interrogation signal it transmits its own response code signal 202 that is received by the antenna 104 and transmitted to detector 106. The detector decodes the response, identifies the tag (typically based on information stored in a computer or other memory device 108), and takes action based on the code signal detected. Various modifications of the illustrated system are known to those of skill in the art including, for example, using separate antennas for the interrogation source 102 and the detector 106 in place of the single antenna 104 that is illustrated.

Modern RFID tags also provide significant amounts of user accessible memory, sometimes in the form of read-only memory or write-once memory, but more preferably offering the user the ability to repeatedly update the memory by rewriting its contents from a distance. The amount of memory provided can vary, and influences the size and cost of the integrated circuit portion of an RFID tag. Typically, between 128 bits and 512 bits of total memory can be provided economically. For example an RFID tag available from Texas Instruments of Dallas, Tex., under the designation "Tag-it" provides 256 bits of user programmable memory in addition to 128 bits of memory reserved for items such as the unique tag serial number, version and manufacturing information, and the like. Similarly, an RFID tag available from Philips Semiconductors of Eindhoven, Netherlands, under the designation "I-Code" provides 384 bits of user memory along with an additional 128 bits reserved for the aforementioned types of information.

This user accessible memory may be exploited to enhance the performance of an item identification system deployed, for example, in a library environment. Presently, libraries identify items by scanning an optical barcode. The unique identifier contained in this barcode is used to access a circulation database including software provided by library automation vendors (LAV software), where more extensive information about the item is permanently maintained. While this system has been highly developed and works very well in many applications, it may have two disadvantages. First, a connection to the circulation database must be established to access the information. This limits the availability of the information when an item is at a location remote from a connection to this database. Second, the retrieval of information from the circulation database can sometimes require an unacceptably long time, particularly during periods of heavy use. By storing certain critical items of information on the RFID tag, both of these limitations can be overcome.

One example of information which could improve the performance of a library identification system if present on the RFID tag itself would be a library identification number. Then, without accessing a database, an item's "home" library could be quickly and conveniently determined by simply scanning the RFID label. Another example of information preferably present on an RFID tag itself would be a code designating whether the item was a book, a video tape, an audio tape, a CD, or some other item. This code could, for example, comprise the media type code specified in the 3M Standard Interchange Protocol, which is available from the assignee of the present invention. By immediately knowing the media type, a library's material management systems could insure that an item was being appropriately processed without incurring the delay and inconvenience of consulting a remote circulation database. Other examples of information suitable for incorporation into the RFID label will be apparent to those skilled in the art.

Another area in which RFID systems offer an advantage over barcode-based systems is in the identification of multiple items. By using sophisticated software algorithms, RFID readers and markers cooperate to insure that all items in the reader's interrogation zone are successfully identified without intervention by the operator. This capability enables the development of numerous useful applications in the areas of inventory control, item tracking, and sorting that would be difficult of impossible to implement with barcode-based identification systems.

C. The Combination Tag

As shown in FIGS. 3 and 5 through 8, the combination tag 20 combines a magnetically-responsive element with an RF-responsive element to provide the advantages of both. Thus, the two elements can be applied to an item of interest at the same time, thereby reducing cost. The combination tag may be provided with a pressure sensitive adhesive covered by a removable liner, which enables the combination tag to be adhered to a surface of the article when the liner has been removed. In another embodiment, the tag uses the magnetically-responsive element as an antenna for the radio frequency-responsive element. The magnetically-responsive element, when used as an antenna, is electrically coupled to the radio frequency-responsive element, and may or may not also be physically coupled to the radio frequency-responsive element.

The combination tag made according to the present invention may be interrogated two ways. First, the RFID interrogation source would use radio frequency signals to request and receive codes from the integrated circuit. This information would indicate, for example, the identification of the article with which the tag is associated, and whether the article had been properly processed. Second, a magnetic interrogation field would interrogate the tag to determine whether the magnetic portion of the marker assembly was active. If the marker assembly was active, the interrogation source would produce a response, such as a notification that the marked article had not been properly processed. Because the magnetic interrogation is more resistant to shielding than the radio frequency interrogation, the magnetic portion of the combination tag would provide enhanced security. Thus, the features of both magnetic and RFID tags are combined into a single combination tag.

In a preferred embodiment, the combination tag includes a magnetically-responsive element that also functions as the antenna in the circuitry of the radio frequency-responsive element. To serve both functions, the antenna material must exhibit low magnetic coercivity and very high magnetic permeability (to serve as an efficient security element), and moderate to high electrical conductivity (to function as an efficient antenna). In addition, the geometry of the antenna must be compatible with both functions. In this embodiment, the antenna could, for example, be fabricated from permalloy, an alloy of nickel and iron.

In one embodiment, a 3M "Tattle-Tape™" brand security strip, or other equivalent magnetic element, may be used as a linear dipole antenna to operate at 2.45 GHz or a similar high frequency. The length, width and thickness of this strip are selected to match the particular operating frequency and other characteristics of the RFID chip used. Typically, the strip would be made from permalloy (available from a number of sources including Carpenter Specialty Alloys, Reading, Pa., under the trade name "HyMu80") or an amorphous alloy such as that available from the AlliedSignal Company of Morristown, N.Y., under the designation 2705M, and its length would be between 6.35 and 16.5 cm (2.5 and 6.5 inches). The terminals of the integrated circuit would be physically connected to the ends of the security strip. Electrical measurements of impedance and power gain have established that such a magnetic strip provides the same fundamental electrical characteristics as the copper or aluminum dipole antennas normally used with such a chip, and thus it would be expected to perform both functions satisfactorily.

Figure 7:
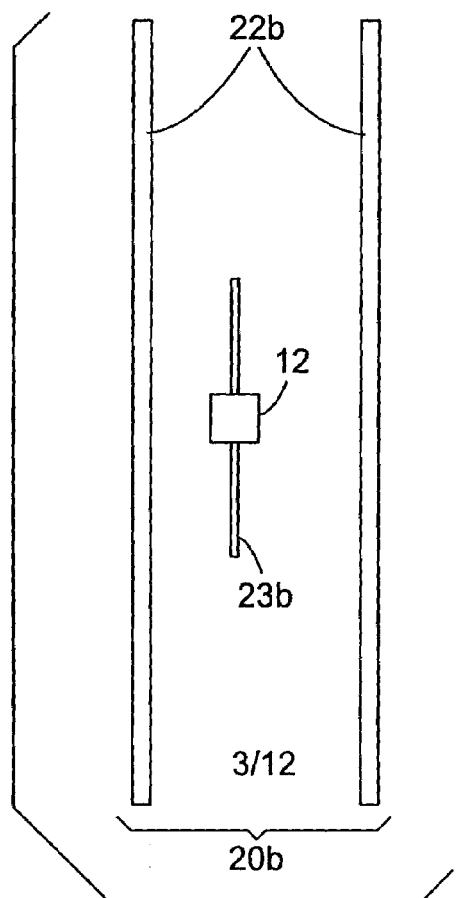
Figure 8:
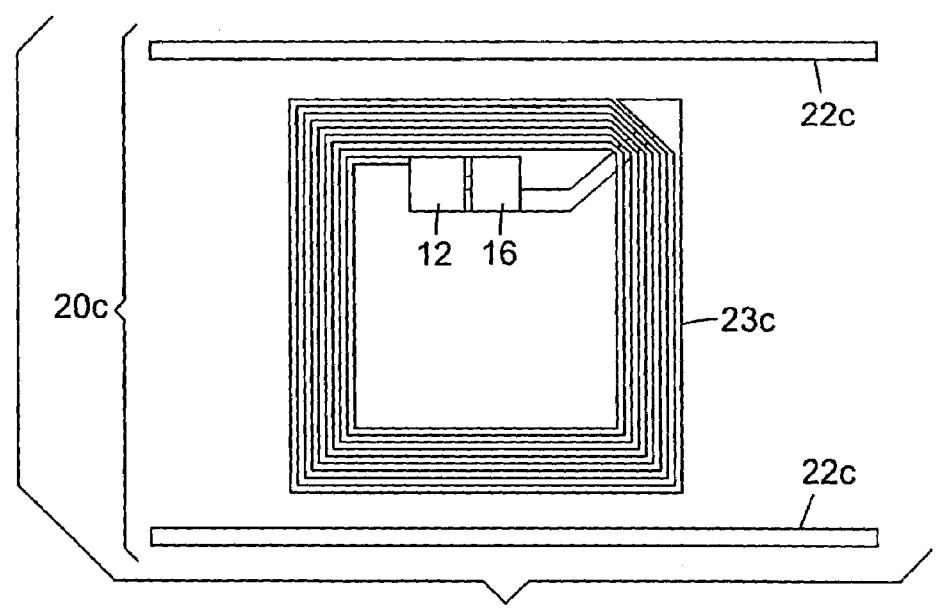

When the magnetically-responsive element is used as at least part of the antenna for the radio frequency-responsive element, the two are electrically coupled to each other. Electrical coupling may occur because of a physical connection between multiple elements (as shown in FIG. 5), or, in the absence of a physical connection, by non-contact electromagnetic coupling (as shown in FIGS. 6, 7, and 8). Non-contact coupling can include parasitic coupling, capacitive coupling, or inductive coupling, and use such antenna components as parasitic antenna elements, reflector and director antennas, Yagi-Uda antennas, or other suitable antenna configurations.

Figure 3:
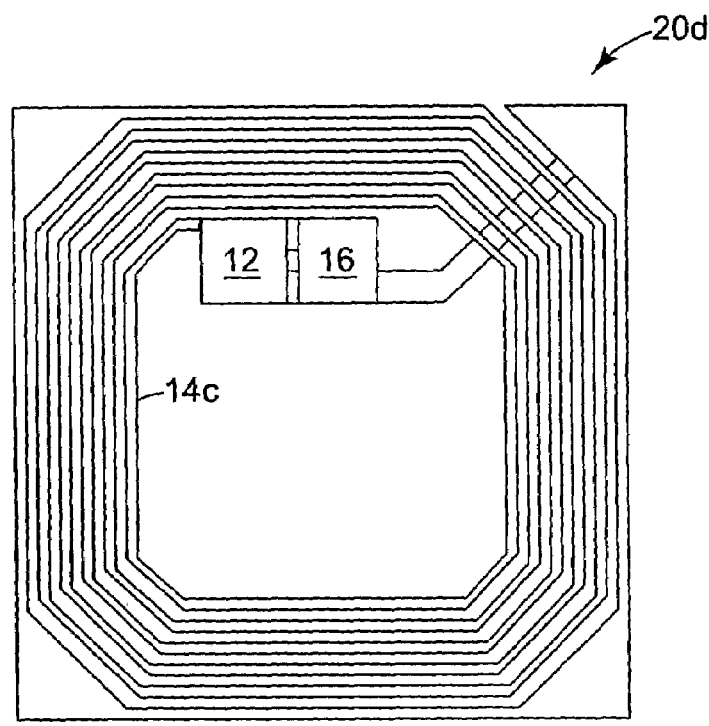
FIG. 3 is a schematic top view of a combination tag.

The combination tag shown in FIG. 3 includes coil turns made from magnetic material. The tag could be, for example, a 13.56 MHz tag having an antenna structure such as 14c in which flux collectors are provided at the corners to improve the magnetic function of the tag. Other types of flux collectors may be provided.

The combination tag 20 shown in FIG. 5 includes a physical connection between the antenna 22, which is made of magnetically-responsive material, and the integrated circuit 12. One or more keeper elements or the type described above also may be applied to the magnetically-responsive material, so that it may be selectively activated and deactivated to provide a dual status tag. The antenna 22a shown in FIG. 6, however, is not physically connected to the integrated circuit 12 or the dipole antenna 23, but is nonetheless electrically coupled to the dipole antenna by parasitic dipole coupling to provide a combination tag 20a. The dipole antenna 23 may comprise either magnetically-responsive material or non-magnetically-responsive material.

FIGS. 7 and 8 illustrate embodiments in which more than one antenna 22 is provided to electrically couple with antennas 23b and 23c, respectively. In the combination tag 20b shown in FIG. 7, integrated circuit 12 includes dipole antenna 23b, which is parasitically coupled to antennas 22b. Antennas 22b are made of magnetically-responsive material, and antenna(s) 23b may be made of magnetically-responsive material. In the combination tag 20c shown in FIG. 8, a radio frequency-responsive element of the type shown in FIG. 2 is parasitically electrically coupled to antennas 22c. Antennas 22c are made of magnetically-responsive material, and antenna(s) 23c may be made of magnetically-responsive material. Other variations of these embodiments are easily designed.

The overall thickness of the combination tag should be as small as possible, to enable the tag to be inconspicuously placed on or in an article. For example, the tag may be applied with adhesive between the pages of a book, and it is desirable to make the tag thin enough to prevent easy detection by observing the end of the book. Conventional ICs may be approximately 0.5 mm (0.02 in) thick, and the overall thickness of the tag is preferably less than 0.635 mm (0.025 in).

The combination tags of this invention may be provided in roll form, to enable the automated sequential application of individual tags to articles. This general system is described in, for example, PCT Publication No. WO 97/36270 (DeVale et al.). Individual combination tags, one or more surfaces of which may be covered by an adhesive (such as a pressure sensitive adhesive), may be removed from the roll and applied between two pages of a book, near its binding. A page spreader may be provided to facilitate insertion of the combination tag, and other options such as sensors to detect the position of various components in the system may also be provided.

The combination tag is believed to have particular, although not exclusive, use in the processing of library materials. Library materials having an RFID tag of this type could be checked in and out more easily, perhaps without human assistance. That is, the materials would automatically be checked out to a particular patron (who may herself have an RFID tag associated with her library card) when the patron passes through a suitable detection zone, and checked back in when the patron re-enters the library with the materials. The tag of the invention may also assist in inventory management and analysis, by enabling library administrators to keep track of materials instantaneously and continuously. These and other features of the invention can, of course, be brought to bear on other applications, such as materials handling in stores, warehouses, and the like.

In another embodiment, the combination tag could provide dual-status marker information both through a magnetic response (indicating whether the magnetic features of the tag had been activated or deactivated) and through a radio frequency response (indicating, through the use of appropriate software, whether the database or the memory on the RFID chip itself showed that the item had been appropriately processed).

The following Examples provide still further information as to the tags used in the embodiments of the invention described in Section II, below.

EXAMPLE ONE

A combination tag was made in accordance with the present invention. A permalloy strip produced from an alloy available from the Carpenter Technology Corporation of Reading, Pa. under the designation "HyMu80" was attached to a test fixture manufactured by Single Chip Systems (SCS) of San Diego, Calif.

The strip measured approximately 1.6 mm (0.625 in) wide by 0.0254 mm (0.001 in) thick by 10.16 cm (4 in) long. The test fixture consisted of a standard SCS 2.45 GHz antenna connected to an LED diode. The device was designed so that upon exposure to a 2.45 GHz field strong enough to power a typical SCS RFID tag the LED would glow, providing an immediate visible confirmation of the proper operation of the power-receiving portion of the device. Upon replacing the standard SCS antenna with the prototype permalloy antenna, the LED illuminated at approximately the same field strength, confirming the successful operation of the prototype.

EXAMPLE TWO

FIG. 3 illustrates another embodiment of an antenna that is believed useful with a 13.56 MHz RFID design. At this frequency, a coil-type antenna geometry is preferred. The spiral turns comprising the coil are formed from a magnetic alloy such as permalloy, either by etching (physical or chemical), die cutting, or deposition through a mask. The straight "arm" portions of the coil serve also as the magnetically responsive elements in this design. However, the reduced length of these metallic elements in this geometry limits the effectiveness of the magnetic security portion of the device. In the embodiment shown in FIG. 3, flux collection elements provided at the corners have been added to the antenna coil to overcome this limitation. The construction shown in FIG. 3 would, preferably, include a capacitor as previously described to tune the operating frequency of the antenna to the prescribed interrogation frequency.

The characteristics of the antenna described in this example were compared with the characteristics of known antennas for radio frequency integrated circuits, and because those characteristics were similar, it is believed that the antenna of this example would function adequately in such an application.

The embodiments of the present invention described below may use either a tag having only an RFID element, or a combination tag, both of which are described above.

II. RFID Systems Applications

Libraries constantly receive a large volume of library materials that are returned by patrons who have finished using those materials. To enable subsequent patrons to locate and check-out the materials again, the materials must be sorted and shelved accurately and quickly, and the patrons must often be assisted in locating the materials once they have been replaced. The various embodiments of the RFID-related inventions described herein relate directly to this process, and may be used together or separately, as desired.

A component of the system described herein is an RFID device, which is either portable (preferably hand-held) or stationary, of the following type. The RFID device is equipped to read information from an RFID tag on an item, such as a patron card, book, or other material. Preferably, the information read from the RFID tag includes a designation of media type (magnetic, print, or optical, for example), which can be used to insure the proper subsequent processing of the item. The RFID device is also equipped with a device, such as the coil, designed to enable the activation and deactivation of the security element portion of the item tag. After the RFID device reads the RFID tag, the device transmits the item identification information to a computer having software provided by a library automation vendor, or LAV. Among approximately 50 current LAV software systems are "Dynix," which is available from Ameritech Library Services of Provo, Utah, "Carl ILS" which is available from CARL Corporation of Denver, Colo., and "DRA," which is available from DRA, of St. Louis, Mo.

There are a number of ways to transmit the information obtained from an RFID tag to the LAV system. One would involve using the commands implemented in the 3M Standard Interchange Protocol (SIP). Another would involve using an electronic device known as a "wedge" to transmit the information as if it originated from a conventional barcode scanner. These and other techniques are well-known to those skilled in the art. In this manner, the RFID component of the RFID device performs the functions formerly performed by an optical bar-code scanner, which may or may not continue to be used with the device. Thus, libraries may continue to use their existing LAV software system interfaces and terminals while enjoying the added functionality and features provided by RFID technology. The RFID device need not include a display if it would cooperate with an existing LAV software system display to provide feedback to the operator. Optionally, a display and other feedback mechanisms may be included in the RFID device as an integrated package.

For a number of applications, it is desirable to provide a portable, preferably hand-held, RFID device. The hand-held RFID device is capable of searching among shelves, bins, piles and library carts. It can essentially search wherever it can be positioned close enough to the items. It is capable of identifying multiple items that are within the range of the device. These and other features make the inventive portable RFID device a valuable library tool. For simplicity, portable RFID devices will be described first in terms of their components and operation, and second in terms of various useful functions for or methods of using such devices. It is important to note that the functions or methods described herein are equally applicable to non-portable RFID devices, and that the functions or methods described above in reference to non-portable RFID devices are similarly applicable to portable RFID devices. The different functions and methods have merely been grouped together with the type of RFID device more often used to perform that function or method.

The hand-held RFID device of the present invention preferably includes an RFID reader and writer, memory, a power source, and software to enable various functions of the types described herein. The RFID reader/writer could consist of a Commander 320 13.56 MHz RFID reader, manufactured by Texas Instruments of Dallas, Tex. Memory, preferably in the form of a computer, may be provided by, for example, a "palm-top" or handheld computer available from 3Com Company of Santa Clara, Calif. under the designation Palm Pilot. The portable computer may include an operating system, a touch-screen display, several buttons for developing user interfaces, a recharge station, a docking station to transfer data between the device and another computer, one or more ports to connect peripherals to the hand-held device (such as an RFID reader) and a battery power supply. Some units may also include a built-in peripheral such as a bar-code scanner. It may also contain various feedback systems, including lights, audio and a display.

As described above, there are a number of options for transferring data between the hand-held device and another processing station. A docking station approach can be used to upload or download data. This method could be used, for example, to upload item identification information prior to performing a search to find those specific items. Another example would be to download data following a collection of items that have been used within the library. The link could be implemented as a docking station (as illustrated); as a wireless or cabled download and/or upload; as a wireless or cabled, real-time link between the hand-held device and another processor, or in any other manner suitable for transferring such data. One such example is a Spectrum24 wireless LAN system, from Symbol Technologies of Holtsville, N.Y. Systems like the Spectrum24 allow mobile users to wirelessly communicate between mobile devices and local area networks. For this operation, the mobile unit will typically include a communication component to support wireless communication, such as Symbol's LA 2400 Wireless LAN PC Card.

The user interface for the device is designed both to communicate the status of searching and to allow the user to enter data. Entering data may include switching the device among various search modes and entering data specific to a task (for example, to check out an item, or to put an item on hold). Feedback to the user is preferably provided through a combination of sound, lights and a display. The display may either be integrated into the unit or separated. When separate, it can be designed in various ways, including as a "wearable" display that can be easily viewed by the user.

A particularly useful embodiment of the hand-held RFID device is as follows. A hand-held RFID device is provided in which the RFID reader, user interface, power source, antenna, processor, and software are all provided in a single integrated unit. By using a hand-held computer such as the Palm Pilot described above, a number of real-time functions of the type described below can be achieved, in contrast to systems in which the RFID device must interact with a separate computer, database, software system, and the like. The software can also provide either limited or full-range capabilities for supporting functions of the type described herein, as desired. The hand-held RFID device also preferably includes an integral power source, although it can be tethered to a larger power source of the type that might be worn around a user's waist. In the case of an integral power source, the source may or may not power the processor, and may be recharged when connected to a docking station. When a hand-held computer is used, it may include its own power source, and may be recharged when connected to the docking station to upload and/or download information.

A hand-held RFID device can interrogate and identify RFID-tagged items whenever it is activated within range of the items. Intermittent activation can be provided by, for example, a trigger associated with the device, so that the elapsed time for which power is required for the RFID device is minimized. The reading distance is a function of many factors, but is expected to be between 15 and 45 centimeters (6 and 18 inches) given current technology and the likely frequencies at which the system would operate. In some applications, it may be desirable to restrict the operating range of the device so that it only interrogates RFID tags associated with items at a closer range. In other cases, the longest available range of operation will be desired. In other applications, it may be preferred to restrict the output power (and thus the reading range) to permit longer continuous operation from the battery pack. The read range will also be influenced by the design of the antenna as well as the orientation of the RFID tag relative to the antenna. It should be appreciated that the read range, battery weight, and lifetime between battery recharges or replacement are often dependent on each other. Various tradeoffs can be envisioned, based on the particular application for the device.

In operation, a particularly useful feature of a hand-held device is obtaining real-time information regarding an item that has been scanned by the device. That is, the hand-held device obtains information from the RFID tag, and either immediately displays that information, or immediately displays information stored within the hand-held device that is related to the tagged item. This is in contrast to devices that must be docked with or otherwise communicate with a separate database of information before that information can be displayed for the user. The hand-held device of the present invention can also be docked or can otherwise communicate with a separate database, if such features are desired.

A. Sorting Library Materials Using RFID Devices.

One embodiment of the present invention uses an RFID device of the type described above to provide sorting assistance to library staff when they are sorting items returned to the library. The sorting operation could be carried out in regard to items that have already been discharged and the associated magnetic security elements resensitized. Alternatively, the sorting operation could be carried out in combination with the discharge and resensitizing operations in a single process. For simplicity, the first operation will be described herein, though the present invention relates to both.

Figure 9:
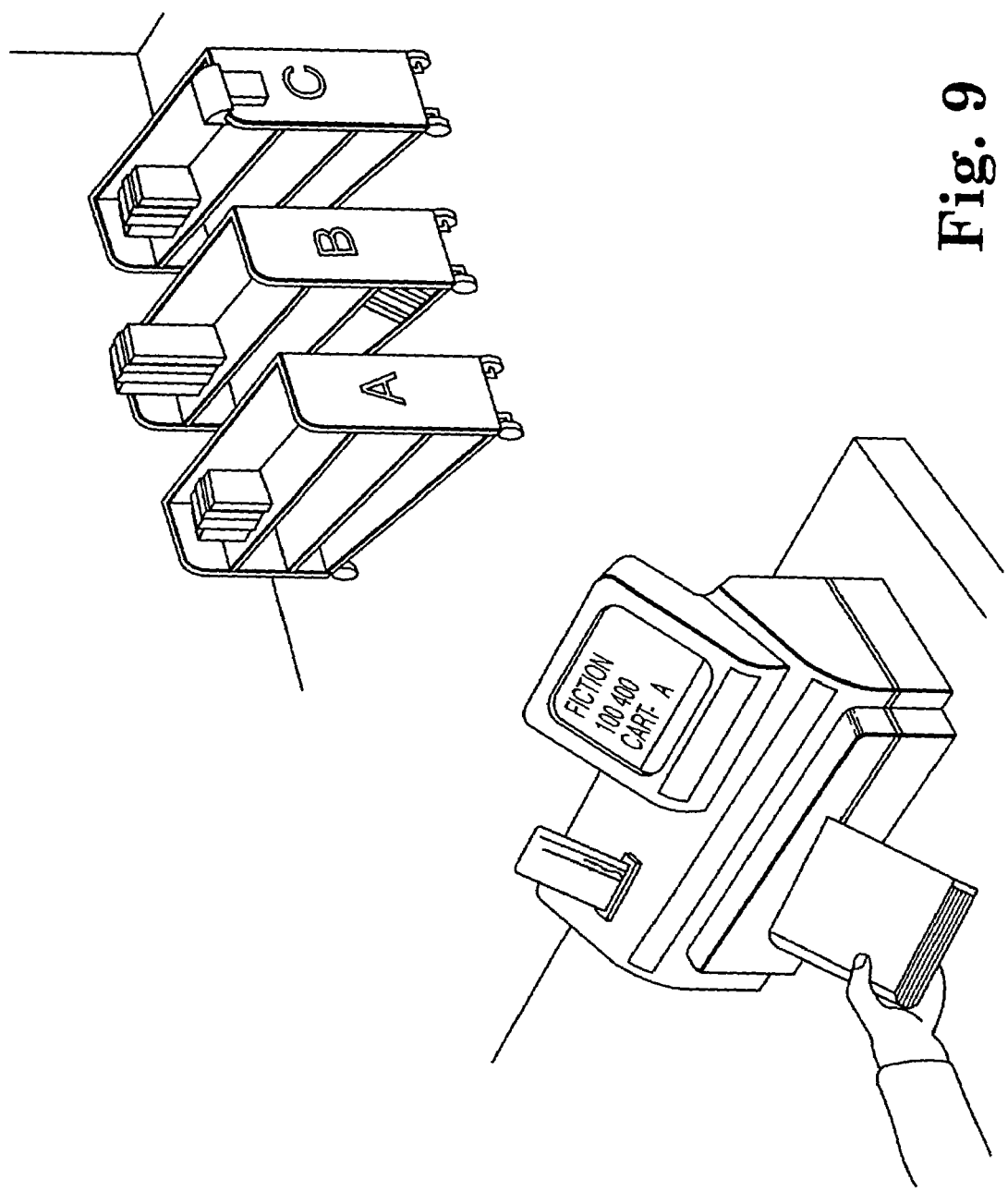
FIGS. 9, 10, 11, 12, 13, 14, 15, 16, 17, 18A, 18B, 19A, and 19B are illustrations of various embodiments of the present invention.

Each library designates their own sorting categories including, for example, adult non-fiction, children's fiction, materials that are being held, and materials that were or will be on ILL (inter-library loan) to another library branch. When an operator begins the sorting operation, he or she can use the RFID device to scan the RFID element associated with a material, and receive, for example, a visual or audible signal of the category to which the material belongs, and the cart or container holding materials within that category, as shown in FIG. 9. For example, the operator may scan a book, learn that it is in the children's fiction category, and learn that it belongs on cart number 123. The identification of the material, category, and temporary (initial) or permanent (final) location of the item may occur in response to information obtained from the RFID element, from LAV software, from a separate sorting database, from another source, or from a combination of the foregoing. A separate sorting database provides potential advantages of performance and flexibility.

Figure 10:
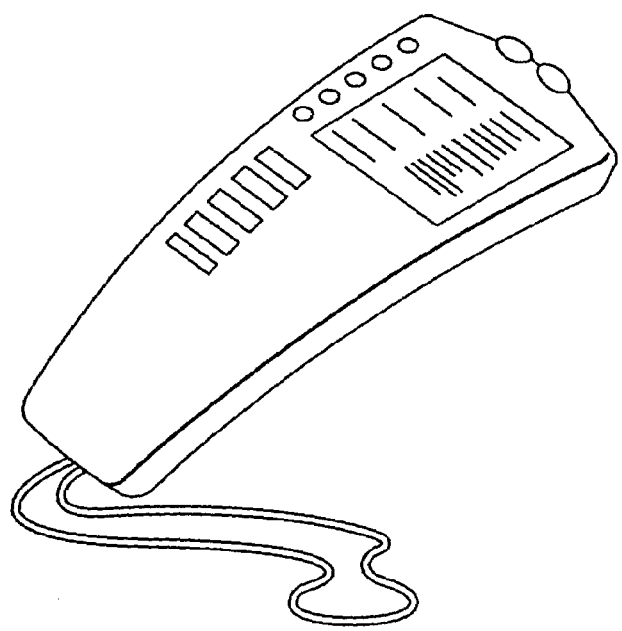
Figure 11:
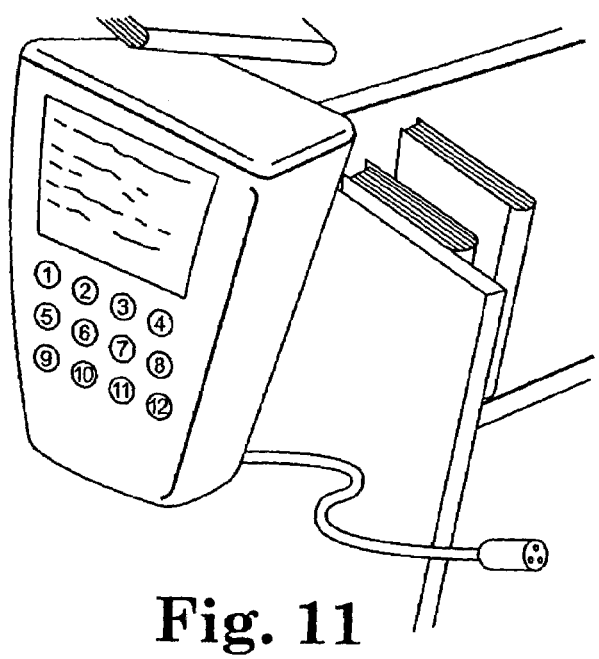
Figure 12:
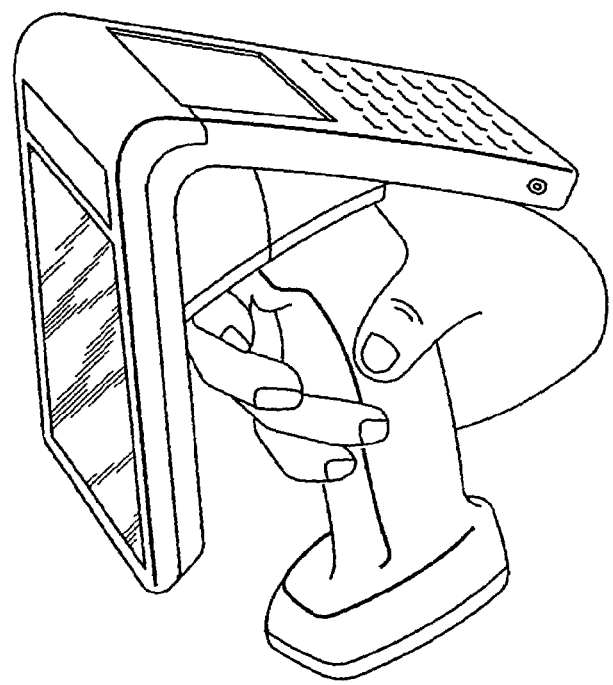

Various RFID devices may be used during the sorting operation. One preferred device is a portable, wearable reader of the type shown in FIG. 10, which would provide the advantage of hands-free operation. Another hands-free option is to position a reader near the repository of items and then pass each item by the reader as it is processed, as shown in FIG. 11. Other options include a hand-held reader as shown in FIG. 12, or a fixed device, as will be apparent to those skilled in the art.

Various procedures may be used to handle the sorting operation. One option includes a database of sorting categories for the library, a database of cart information that includes the number of shelves and capacity of each shelf for each cart, and a sorting processor. The sorting processor tracks the status of each cart, how close to capacity it is and the current category assigned to the cart. As an item is processed, the identification of the item is sent to the sorting processor. The processor uses information about cart status and sorting categories to determine where to place the next item. It then displays the sorting instruction to the user and updates the cart database.

FIG. 9 shows an example of the display of sorting information. In this case, it indicates both a fiction sort and a specific library cart location on a display attached to a device. The same display could stand alone, independent of the device, and be used for feedback with the other identification options described above. Other methods of display could also be used. LEDs could be attached to each shelf on each cart. The sorting processor could send a signal to the appropriate shelf, causing the LED to be turned on. Audio signals also could be used. Optionally, there could be RFID readers attached to the carts that verify placement of the item on the cart. This would assure that the item was placed properly and help in tracking operations.

An RFID device, used in this sorting environment, could include additional functions. The device could accept information (commands), such as that a specific cart is full, that a specific cart should be associated with a particular category of materials (such as fiction, or damaged materials, or the like). The device could also incorporate an RFID tag printer that would automatically dispense tags having RFID elements, or dispense them on demand.

In one embodiment of an RFID tag printer, a bar code scanner is attached to a device that includes an RFID reader/writer, and a dispenser holding a roll of RFID tags. The tag has adhesive on one side so that it can be placed in an item. The adhesive could be temporary or permanent depending upon the type of item. The device is optionally connected to the LAV software system. When an item is placed under a bar code scanner, the scanner reads the bar code for the item. Optionally, the device sends the item ID to the LAV software to verify that the item belongs to the library and that it should have an RFID tag, and potentially to extract additional information about the item, such as the type of item. The RFID writer then writes the appropriate information to the next available RFID tag. Optionally, the user could input additional information to be placed on the tag via buttons or a keyboard. For example, the user might wish to indicate the type of item. When all information has been input, the user indicates that a new tag should be printed and the printer dispenses the tag. The user places the tag in the item. This would be useful for items that do not currently have any RFID element, or have a damaged RFID element. Another option is to dispense a temporary RFID tag that can be easily applied to and removed from library materials. This could be done for all or specific non-RFID items (like holds). Then, that item could be tracked by RFID from the point of sorting through final shelving, at which time the tag could be easily removed and even reused.

The benefits of the RFID-based sorting system include knowing the specific location of each item after the sorting operation, and the ability to generate a list of all items in a given initial location (e.g., all items on cart 123). RFID-based sorting would also provide more accurate sorting, and could be quickly implemented by a library without the need for extensive staff training.

B. Carts Incorporating Portable RFID Devices

After library materials have been sorted as described above, they are typically loaded onto portable carts to be transported to their appropriate locations in the library. Library carts of this kind have traditionally included only a frame, wheels, and shelves, but the library cart of the present invention may also include several features of great value to a library. Library carts incorporating portable RFID devices may be referred to simply as "smart carts" herein for convenience.

Smart carts in accordance with the present invention may interrogate their own contents to determine the materials stacked thereon, and may determine the order of the items on the cart, including which shelf each item is on. The primary benefits of a smart cart are that a smart cart can assist library staff with the reshelving process, and that an item can be tracked to a specific cart location even before it has been reshelved. Although the embodiment described in the most detail herein is related to carts, and specifically carts in a library, those of skill in the art will appreciate that the present invention may have equal application to other collections of items in, for example, bins, piles, shelves, and rooms.

In one embodiment, the smart cart may be used in combination with a hand-held RFID device of the type described above and shown in FIG. 12. An operator may use the hand-held RFID device and pass it by the cart in a particular order (for example, from left-to-right, and top-to-bottom). As the RFID device passes by the items, the device reads the items having RFID tags, and records and stores their positions on the cart. The RFID reader identifies the cart by reading a tag on the cart or by entering the cart identification information into the hand-held unit. If the user only needs to record the items that are on a cart, but not the exact item position on the cart, the user can pass the device by items in any order. Because the entire cart can be read after it is loaded, the loading process is not delayed, and the cart inventory may be more accurate. Alternatively, an RFID device may be affixed to the cart, and the item may be passed by the reader and shelved, after which the staff person can enter the shelf location of the item on the cart.

With any of the foregoing embodiments, non-RFID items can be quickly determined when the reader is unable to identify a tag in the item. Those items can, at the user's option, be separately handled, identified with a bar-code reader or designated to receive an RFID tag for conversion to the RFID system.

Figure 13:
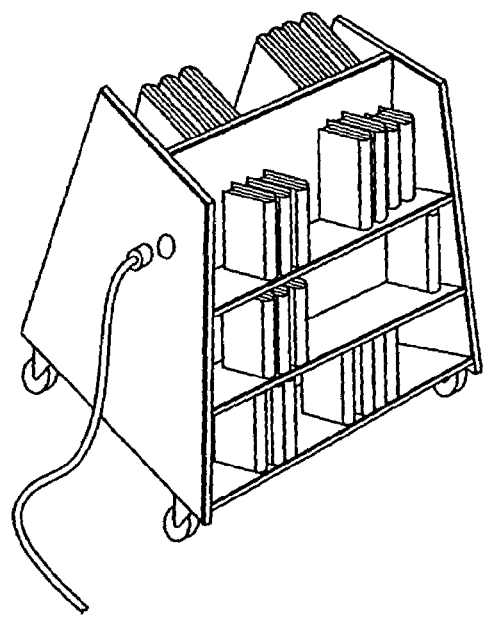

The contents of a smart cart and their locations may also be determined in several ways that are expedient, and require little or no involvement by the library staff. One is to use a smart cart having antennas running the length of each cart shelf. The antennae are connected to a suitable RFID device, which enables the cart to take an inventory of the items and their locations. The cart may also be connected to an existing LAV software system, and the entire contents of the cart and the identity of the cart may be downloaded to the LAV software system. Alternatively, the information could be kept in a separate database. In both cases, this "plug-in" cart would provide for quick and immediate transfer of accurate data as to the identity and specific location of the library materials. A plug-in cart is illustrated in FIG. 13.

One embodiment of a smart cart system is as follows. The user initiates a "cart reading operation" via a keyboard or button interaction. The cart optionally has an RFID tag associated with it. If a tag is available, the software initiates an RFID interrogation to establish the identity of the cart. Alternatively, the user initiating the cart reading operation may input the cart identification information into the RFID device manually. The software sends the cart ID to the location database, and then interrogates each shelf. The identification of each item on the shelf is sent to the software which then sends the information to the location database. After interrogation is complete, the software can optionally send the information from the location database to the LAV software to update the latter.

Figure 14:
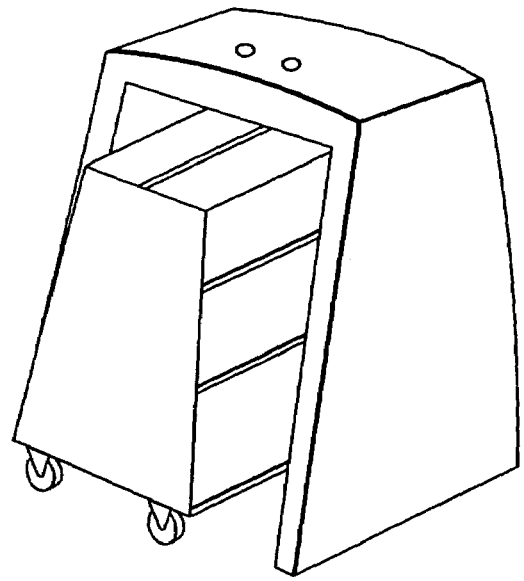
Figure 15:
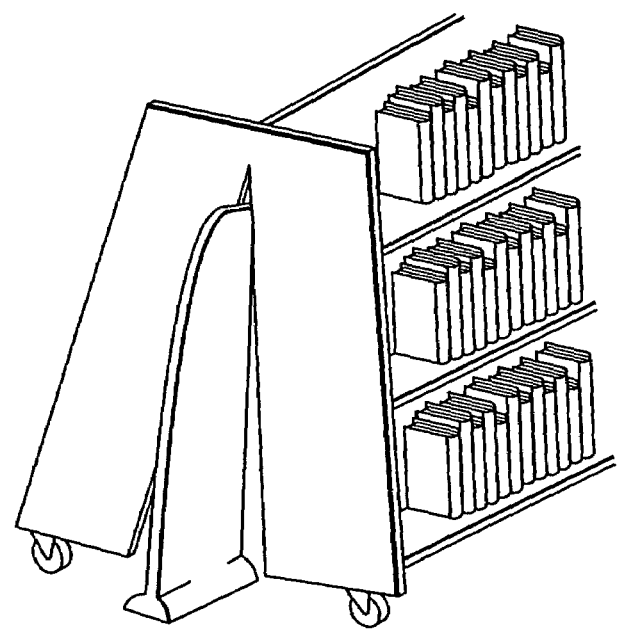

Another method of identifying library materials and their exact location on a cart would be to pass the cart through an RFID tunnel, or over an RFID "anti-tunnel," as illustrated in FIGS. 14 and 15, respectively. As the cart moves under the tunnel or over the anti-tunnel, the RFID reader in each can determine the identity and approximate location of all items on both sides of the cart. One benefit of the tunnel is that it would not require a special cart so long as the cart can be rolled under the tunnel, although non-metallic carts may be preferred to metallic carts so as not to interfere with the RFID system. The anti-tunnel approach would require a special cart that can be rolled over a reader that is designed to fit under the center of the cart.

Figure 16:
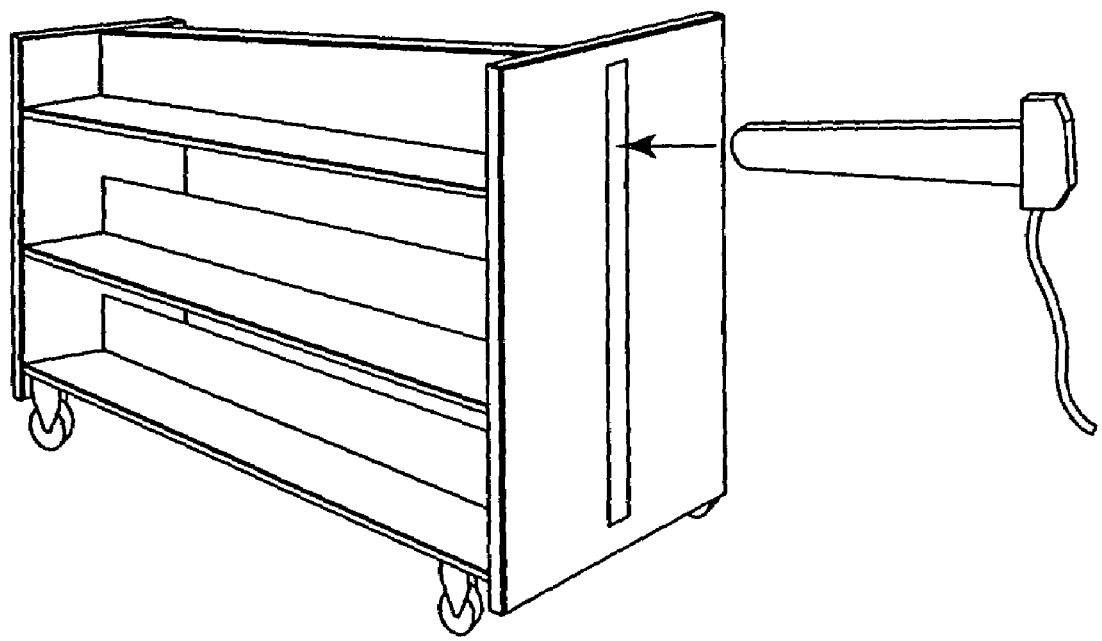

One further method of identifying and locating items on a cart involves the use of a "sword reader" of the type shown in FIG. 16. This "sword" has RFID reading capability, and can when inserted into the proper location or locations in the cart determine the contents and locations of the items on it.

C. Shelving Aids Using RFID Devices

Once the library materials have been arranged on a cart or other initial location, it may be desirable to provide assistance in shelving using information that was placed in the database of information obtained by the smart cart as described above. Another embodiment of the present invention thus relates to aids for shelving materials, preferably including a list of the materials in the order in which they should be shelved. The list may contain specific location information for carts, and interactive assistance may also be provided.

The first step is to establish a desired order and process for shelving. Libraries often establish their own method for shelving library materials. Each section of the library may contain a different ordering scheme. For example, adult fiction may be shelved by the author's last name, and then by title within that author, whereas adult non-fiction may be sorted by the Dewey Decimal system. The library may also specify the preferred path for traversing the library during the reshelving process (for example, start shelving shelf 1 in adult non-fiction, then go to shelf 4). One way to establish methods and orders is to create a database of shelving information automatically as inventory is taken. In one embodiment, a shelving database is created by the user when the user sweeps an RFID device past all items on all shelves using an order determined by the user. As each item is read, it is sent to the shelving processor. The shelving processor places the information into a shelving database, maintaining the order in which the items were input. The shelving processor may also provide an analysis of shelving order using additional information gathered from the tags, a separate database or the LAV software. For example, after completing a bookshelf, the shelving processor might use information from the LAV software to determine that the shelf contained Adult Fiction and that the shelf order was established using author last name. In this manner, the database may be "taught" an appropriate shelf order, which may then be used in connection with other library operations.

Using the configuration information established by the library or the inventory process described above, together with the database of a "smart cart," a shelf-order can be established for a cart. In one embodiment, a shelf-order list can be printed for the user. A shelf-order list for a given cart may indicate, for example, that the first item, call number 913.47A, the first portion of the title of which reads "Join me at my home. . . ", is located on cart shelf 3, and that it is the fifth book on that shelf The second item to be shelved could be, for example, call number 916.8, the first portion of the title of which reads "Another reason . . . ", and the shelf order list would denote that the book is located on cart shelf 2, and is the ninth book on that shelf. The third item to be shelved could be, for example, call number 916.912, the first portion of the title of which is "The life and time . . . ", and the shelf order list would indicate that the book is located on cart shelf 1, and is the fourth book on that shelf, and so on. The shelf order list could also be created for more than one cart, in which case the list would include an additional field indicating the cart on which the book is located.

This embodiment of the system is beneficial because library materials within a particular class could be randomly placed on the appropriate cart, and yet could be shelved directly without further sorting. Alternatively, the unsorted cart could be sorted, which may be especially helpful for novice shelvers who might have a difficult time understanding the proper order for shelving items. Lastly, the RFID shelf order system could optimize the path taken through the library when reshelving items, resulting in a substantial savings of time for library staff.

Figure 17:
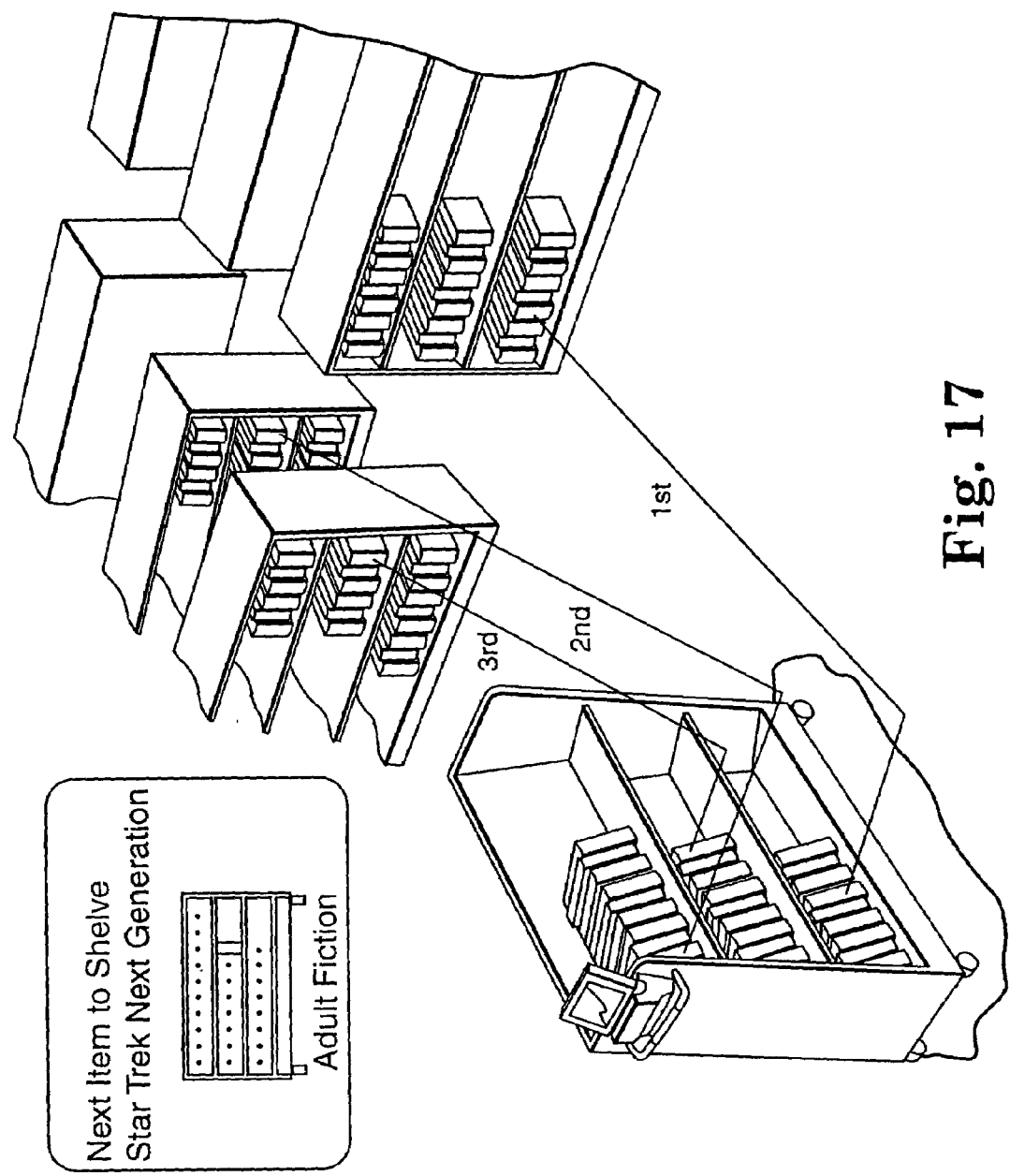

In another embodiment, a portable RFID device having a display may be used to provide the shelf order information, rather than a paper copy. The display could be mounted on the cart as shown in FIG. 17, worn by the user, or held in the user's hand. As shown in that illustration, the RFID device display may inform the user of the next item to be shelved, its location on the cart, and its location on the shelf. It may be preferable to provide a portable RFID device that provides shelf order information to the user, and accepts input from the user. Input could include the ability to scroll items, to indicate when an item has or has not been reshelved, to ask for more information about a particular item or to display a summary list of the contents of a cart.

In another embodiment, the portable RFID device helps the operator find the next item to be shelved using the RFID tag affixed to the item. The operator sends a message to the shelving processor indicating that the materials on a specific cart should be shelved. The shelving processor determines which item should be shelved first using information from the location database and the shelving database. The operator scans the shelf with a hand-held RFID reader. Each item ID is sent to the shelving processor. When the ID matches the ID of the item to be shelved, the shelving processor sends a message to the operator. The message could be a visual or auditory cue such as a flashing LED on the RFID handheld device, an LED on the shelf, or a beep. The operator then removes the item from the cart, and passes it by an RFID reader that verifies that the correct item has been removed and updates the current location of that item to "on shelf." The process continues until all items have been shelved. The portable RFID device could also locate whether a specific item is on the cart using the RFID tag affixed to the item.

The present invention also extends to an RFID device that provides a list of all items within a specified area of the library (shelves for non-fiction 200–300, for example), and then presents a shelf-order list of all items that have been checked in, but not yet shelved, that belong in that area. The list includes where to find each item. An alternative to producing hardcopy lists is to provide portable devices, in which each device is "programmed" to look for items that belong in a particular section of the library. This embodiment of the present invention is particularly useful when specific individuals may be responsible for maintaining a certain part of the library, or when it is especially important to keep particular sections of the library as up to date as possible.

A variation of an invention previously described is to enable a user to read through any collection, such as an unsorted or rough-sorted book shelf, and to pull out the items that meet a certain criteria (e.g., non-fiction 100–200) in shelf order. This embodiment is particularly useful when items are already on an initial sorting area and ready for shelving, which aids a user in creating shelf-ordered carts from an initial sorting area. Because any collection can be read, this is not limited to pre-sorted shelves of library materials. Any area of items needing to be shelved can be processed in this way.

A final embodiment enables a user to use a portable (preferably hand-held) RFID device to locate the correct place on the shelf for a given item. The user identifies an item to shelve and then passes the hand-held device across a row of items on a shelf. As the correct position for shelving the new item is detected, feedback is given to the user. Feedback can be provided in a combination of ways, including on a display, with audio feedback and/or with lights (LED's) on the hand-held device.

This function can support "free-shelving," which is most typical in libraries, wherein the item may be placed on any shelf so long as it follows and is preceded by the correct items in shelf order. In a more constrained shelving system, items must be placed in a specific location on a shelf Free shelving is more typical and requires more processing to produce the right shelf location for an item. When constrained shelving is used, LED's can be added directly to shelf locations and they can light up to indicate where an item should be placed. Even in the free shelving scenario, LED's can be added to a shelf, but determining which shelf LED to light is a dynamic decision based on what is on the shelf at the time. Underlying this function is also an understanding of proper shelf order. Each library indicates how they want items shelved (by, for example, Dewey Decimal number, or author's last name). These shelving schemes can vary across the various sections in a library. This function could also support totally unconstrained shelving, in which items are shelved in essentially random order. This is commonly done for shelves of materials being held, and may be applicable in other situations as well. In this situation, an RFID reader can be used to find an item from the unsorted shelf.

Benefits of this embodiment include that this system can help a shelver identify where to shelve an item. This can be particularly useful for the novice shelver, which may speed up the shelving operation. Once the shelver is close to the location, the device can quickly zero in on the precise shelf location. An additional a feature of the embodiments described in this section is the ability in certain of the embodiments for a user to obtain information in real time, as opposed to having to download or print out the information.

D. Patron Navigation Using RFID Devices and Components

Many patrons have difficulty navigating within the library. Difficulties include finding the desired building, the desired floor of the library, getting to the desired section, finding the desired shelf and ultimately locating the materials of interest. Some patrons have specific items in mind, such as titles, whereas others are more interested in subjects, such as Revolutionary War History. The embodiments of the invention described in this section assist library patrons with navigation, and provide guidance that is visual, interesting, and perhaps even fun.

Figure 18A:
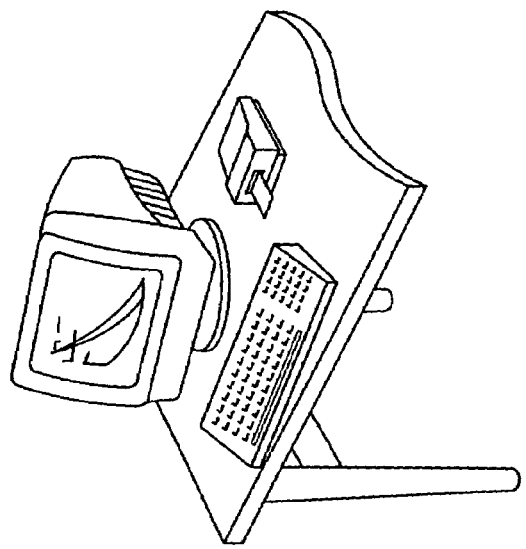
Figure 18B:
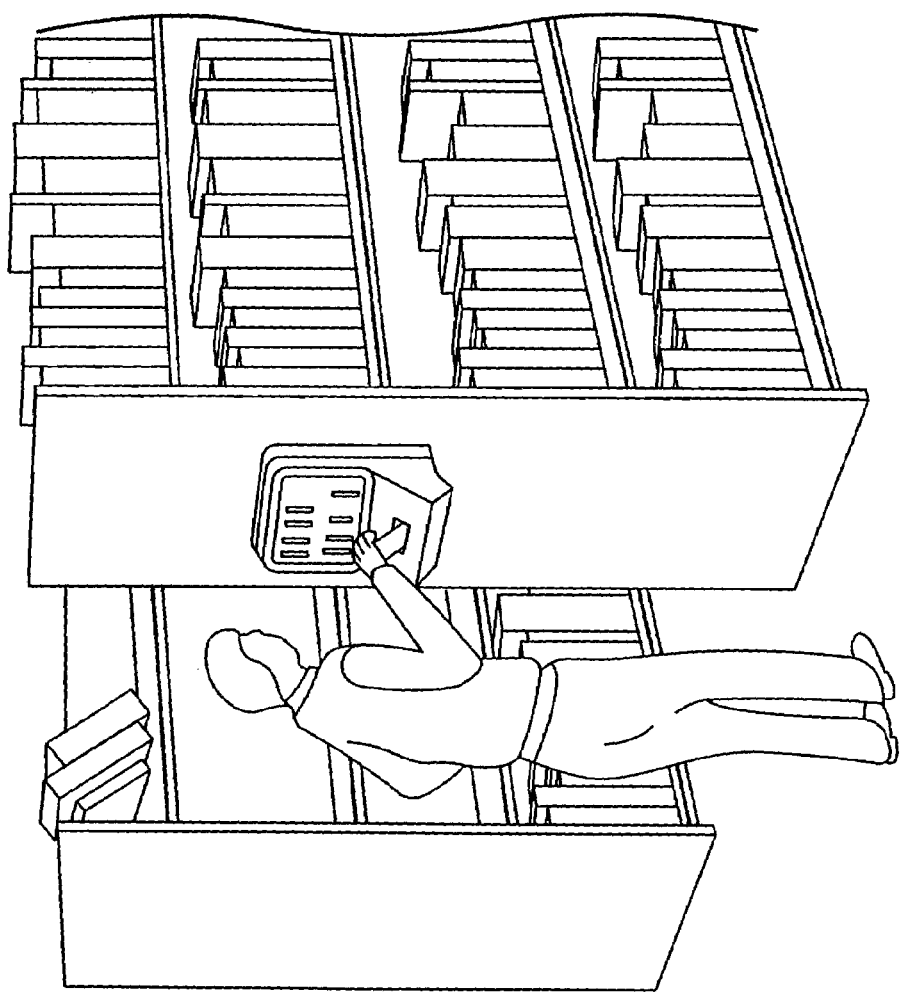
Figure 19A:
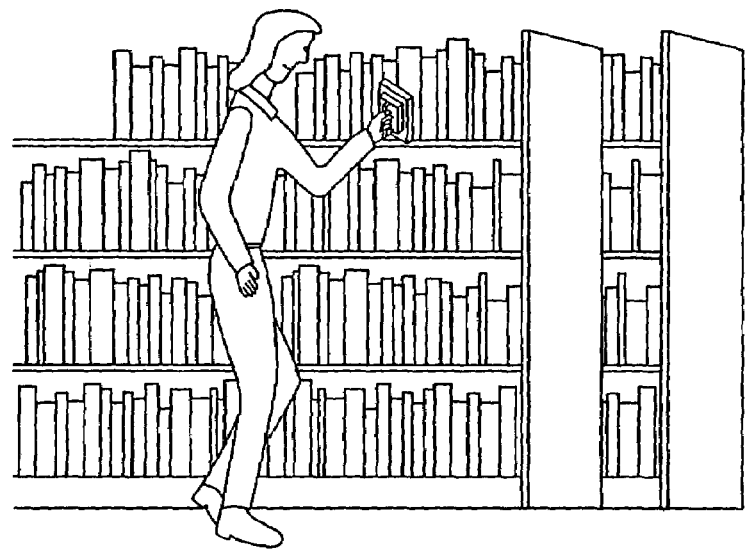
Figure 19B:
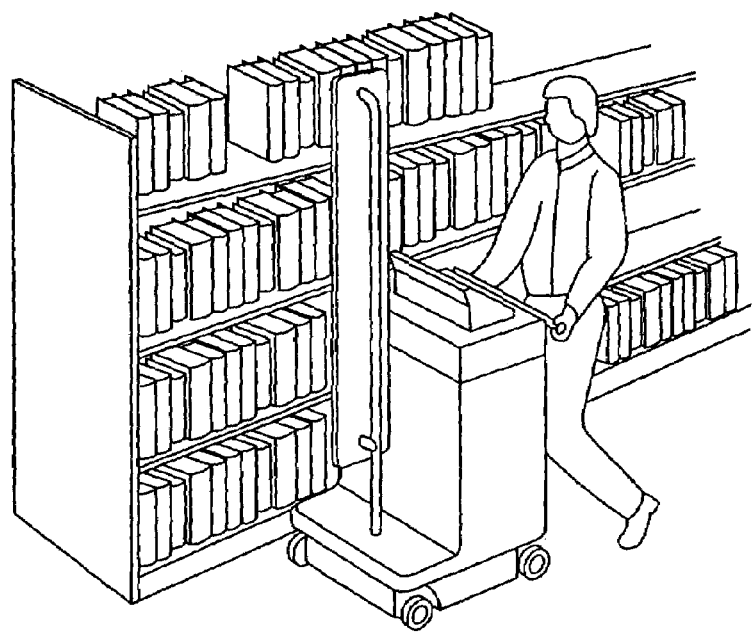

FIGS. 18A and 18B illustrate one embodiment of the invention, in which a card having an RFID element is loaded, or programmed, with one or more items of interest as shown in FIG. 18A. Loading can be done at a patron accessible terminal. In this embodiment, a loading processor can interact with the LAV database directly or via a searching processor to determine the categories and items that are currently available. That information is displayed to the patron. The patron interacts with an input device such as a keyboard or mouse to select a category or set of items. In this example, the patron selects two books, The Life of Mark Twain and Tom Sawyer. This information is sent to the loading processor that places the information into the RFID locator card.

An alternative is to have a staff load a card for the patron at, for example, a reference desk. There may also be "preprinted" cards by subjects of interest that a patron can pick up and use in the library. The data loaded onto the card could be specific titles or subject areas of interest. Instead of using a special-purpose RFID card, a patron's actual library card could be used, or a special in-library card could be designed for this purpose. For in-library use cards, the patron would leave them in the library when departing. The in-library use card could have a TATTLETAPE™ magnetic security marker of the type available from the assignee of the present invention affixed thereto to prevent theft of the card.

Once the card is loaded with the desired information, the patron can use it to navigate within the library as shown in FIG. 18B. RFID devices may be strategically placed throughout the library, and when an RFID card is presented to one of these readers, it indicates to the patron where the item(s) of interest can be found relative to the reader's location. The device might include a display which could be complete with map and graphical instructions for finding the item, or perhaps only a series of LED lights that light up to acknowledge that the item is with the aisle nearest the device, or that light up a part of a library map where the item can be found. The information provided depends on how close the patron is to the target item(s). For example, it might indicate to go to another floor of the library (when far from target) or half-way down an aisle to a specific shelf when the patron is close to the item of interest.

In another embodiment, the items or subjects of interest may be loaded into a hand-held RFID device that can then be taken around the library to locate the item(s). The data can be loaded in a number of ways, as described above. The shelves containing the items are activated, or provide some type of signal, when the RFID device is pointed at them. Then, the patron can follow the lights to find the approximate location of the library material. Once there, the unit can move into item locator mode to help the patron find the specific item. In this mode, the device can read individual items and indicate, via feedback on the device, when the target item has been located. The unit might also show mini-library maps to further help the patron find their way around the library. Variations on this embodiment may be particularly useful for library patrons with diminished eyesight.

A related aspect of the present invention is the use of RFID library cards, not only for purposes of checking in or checking out library materials, but also to track the movement of patrons through a library. The number of patron accesses can be tracked and then statistically analyzed to obtain usage information. For example, the system could count the number of patrons that enter a certain location of the library, how long people spend in various places within the library, the number of uses of certain library equipment such as computers and copiers.

RFID library cards may also be used for access control. In this embodiment, the RFID library card controls which patrons or staff may use which facilities. A facility may be a room, in which case the door lock is controlled. Access may be controlled for using certain equipment or other library facilities. The control may further determine which computer operations are permitted to be performed by a user so that, for example, children would be denied access to certain materials or electronic internet sites. Implementation can be done by placing readers at these special control points or by having the person carry the reader and then reading the location tag to enable access.

Lastly, an RFID library card may be used in conjunction with certain accounting functions performed in a library. The RFID library card would be integrated with information regarding general fees and fines that are collected in the library. These charges include overdue charges, fees for using certain equipment, copying fees, and the like. The card can act as either a debit or credit card. The data (account) can be kept on the card (updating the chip each time) or in a separate database. The main advantage, for the patron and the library, is to unify and simplify the methods by which various fees and fines are handled. Today, many of these functions are handled manually and often with some unpleasant feelings between staff and patrons. This system would allow a mostly automated method of handling these problems, reducing tension and improving staff productivity to deal with more important issues. Another option is for the patron to designate a credit card of his/hers to be associated with their RFID library card and automatically charged for fees. Thus, the library card is presented to pay fees, but it has no money directly associated with it.

We claim:

1. A method of using an RFID device, comprising the steps of:
    (a) interrogating an item having an RFID element associated therewith;
    (b) inputting information to the device to describe a location;
    (c) determining whether the interrogated item belongs at the location; and
    (d) providing an appropriate signal.

2. The method of claim 1, wherein the location has a separate RFID element, and step (b) comprises scanning the RFID element associated with that location.

3. The method of claim 1, wherein the item is a library material, and the location is a library storage location.

4. A method of using a handheld REID device for reading information from an RFID element, comprising the steps of interrogating the RFID tags associated with each of a group of items, detecting where within the group of items a desired item should be placed, and providing an indication to the user of that location.

5. A method of using an RFID device for identifying and locating items having an RFID element associated therewith, comprising:
    (a) providing information to the RFID device identifying a cart;
    (b) interrogating the items with the RFID device by passing the cart through a tunnel to determine the identity of the items; and
    (c) associating the items with the cart.

6. The method of claim 5, wherein the cart has a separate RFID element, and wherein step (a) comprises interrogating an RFID element associated with the cart.

7. The method of claim 5, wherein the method further includes the step of arranging and interrogating the items in a series, so that the RFID device can determine a location of one item with respect to other items.

8. The method of claim 5, wherein the items are library materials.

9. The method of claim 5, wherein step (c) comprises passing the RFID device into or through the cart.

10. The method of claim 5, wherein the cart includes a shelf having an antenna associated therewith.

11. The method of claim 5, further including the step of:
    (d) displaying the items and their respective locations within the cart.

12. The method of claim 5, further including the step of:
    (d) downloading the information in step (c) to a computer.

13. A method of locating an item of interest associated with an RFID element among a larger group of items each associated with an RFID element, comprising the steps of:
    (a) providing a card having an RFID element;
    (b) transmitting information related to an item of interest to the card and storing that information in the RFID element;
    (c) positioning RFID card readers at positions near the item of interest;
    (d) interrogating the RFID card with the RFID card reader; and
    (e) providing an indication of the location of the item of interest relative to the location of the RFID card reader.

14. The method of claim 13, wherein step (e) comprises providing a visual display of the location of the item of interest.

15. The method of claim 14, wherein the visual display comprises a map of the area including the item of interest.

16. The method of claim 13, wherein the item of interest is a library material, and the larger group of items comprise other library materials.

* * * * *

UNITED STATES PATENT AND TRADEMARK OFFICE
CERTIFICATE OF CORRECTION

| | | |
|---|---|---|
| PATENT NO. | : 7,044,373 B1 | Page 1 of 2 |
| APPLICATION NO. | : 09/368817 | |
| DATED | : May 16, 2006 | |
| INVENTOR(S) | : Sharon R. Garber | |

It is certified that error appears in the above-identified patent and that said Letters Patent is hereby corrected as shown below:

Title Page 2
Col. 2, line 42, (U.S. PATENT DOCUMENTS) after "5,689,238 A" insert -- * --.

Title Page 3
Col. 1, Line 21, (U.S. PATENT DOCUMENTS) after "6,749,116" delete "B1" and insert -- B2 --, therefor.

Col. 1, line 22, (U.S. PATENT DOCUMENTS) after "6,753,830" delete "B1" and insert -- B2 --, therefor.

Col. 2, line 15, (OTHER PUBLICATIONS) delete "Norcrosss" and insert
--     Norcross --, therefor.

Col. 3
Line 13, delete "nut" and insert -- out --, therefor.

Line 17, delete "'660" and insert -- '660 -- therefor.

Col. 10
Line 51-62, below "Calif." delete "The strip measured approximately 1.6 mm (0.625 in) wide by 0.0254 mm (0.001 in) thick by 10.16 cm (4 in) long. The test fixture consisted of a standard SCS 2.45 GHz antenna connected to an LED diode. The device was designed so that upon exposure to a 2.45 GHz field strong enough to power a typical SCS RFID tag the LED would glow, providing an immediate visible confirmation of the proper operation of the power-receiving portion of the device. Upon replacing the standard SCS antenna with the prototype permalloy antenna, the LED illuminated at approximately the same field strength, confirming the successful operation of the prototype." and insert the same after "Calif." on line no. 50.

Col. 17
Line 44, After "shelf" insert -- . --.

Col. 19
Line 2, after "shelf" insert -- . --.

UNITED STATES PATENT AND TRADEMARK OFFICE
CERTIFICATE OF CORRECTION

PATENT NO. : 7,044,373 B1
APPLICATION NO. : 09/368817
DATED : May 16, 2006
INVENTOR(S) : Sharon R. Garber It is certified that error appears in the above-identified patent and that said Letters Patent is hereby corrected as shown below:

Col. 21
Line 23, In Claim 4, delete "REID" and insert -- RFID --, therefor.

Signed and Sealed this

Twenty-sixth Day of December, 2006

JON W. DUDAS
*Director of the United States Patent and Trademark Office*